US011490271B2

(12) United States Patent
Han et al.

(10) Patent No.: US 11,490,271 B2
(45) Date of Patent: Nov. 1, 2022

(54) BEAM TRAINING METHOD AND APPARATUS

(71) Applicant: HUAWEI TECHNOLOGIES CO., LTD., Shenzhen (CN)

(72) Inventors: Xiao Han, Shenzhen (CN); Chenlong Jia, Shenzhen (CN); Mengyao Ma, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/199,964

(22) Filed: Mar. 12, 2021

(65) Prior Publication Data
US 2021/0204145 A1    Jul. 1, 2021

Related U.S. Application Data

(63) Continuation of application No. PCT/CN2019/103976, filed on Sep. 2, 2019.

(30) Foreign Application Priority Data

Sep. 14, 2018  (CN) .......................... 201811076944.1

(51) Int. Cl.
H04W 16/28    (2009.01)
H04B 7/06     (2006.01)
H04W 88/08    (2009.01)

(52) U.S. Cl.
CPC .......... H04W 16/28 (2013.01); H04B 7/0617 (2013.01); H04W 88/08 (2013.01)

(58) Field of Classification Search
CPC .. H04B 7/0413; H04B 7/0617; H04B 7/0456; H04B 7/0417; H04B 7/0639
(Continued)

(56) References Cited

U.S. PATENT DOCUMENTS

2010/0103045 A1* 4/2010 Liu ...................... H04B 7/0632
                                                              342/372
2015/0110071 A1* 4/2015 Jo ...................... H04W 36/0072
                                                              370/331
(Continued)

FOREIGN PATENT DOCUMENTS

CN    104918228 A    9/2015
CN    108260180 A    7/2018

OTHER PUBLICATIONS

Kei Sakaguchi et al, Millimeter wave Wireless LAN and its Extension toward 5G Heterogeneous Networks, IEICE Trans. Commun.,vol. E98-B, No. 10, Oct. 2015, 18 Pages.
(Continued)

Primary Examiner — Sam K Ahn
Assistant Examiner — Gina M Mckie
(74) Attorney, Agent, or Firm — Hauptman Ham, LLP

(57) ABSTRACT

This application provides a beam training method and apparatus. The method includes: A first access point AP determines first information. The first information is used to indicate an association beamforming training A-BFT time period, the A-BFT time period is used to perform A-BFT between a plurality of APs and a station STA within coverage of the plurality of APs, and the plurality of APs include the first AP and at least one second AP. The first AP sends the first information. A first STA receives the first information, and determines, based on the first information, a time period for performing sector sweep. The beam training method and apparatus in embodiments of this application can be used to control the plurality of APs and a plurality of STAs to perform association beamforming training.

13 Claims, 17 Drawing Sheets

300

A first access point AP determines first information, where the first information is used to indicate an association beamforming training A-BFT time period, the A-BFT time period is used to perform A-BFT between a plurality of APs and a station STA within coverage of the plurality of APs, and the plurality of APs include the first AP and at least one second AP  — S310

The first AP sends the first information — S320

(58) Field of Classification Search
USPC .......................................................... 375/267
See application file for complete search history.

(56) References Cited

U.S. PATENT DOCUMENTS

| | | | |
|---|---|---|---|
| 2015/0244432 A1* | 8/2015 | Wang | H04B 7/0697 |
| | | | 375/267 |
| 2016/0191132 A1 | 6/2016 | Rajagopal et al. | |
| 2017/0006631 A1* | 1/2017 | Tian | H04W 74/002 |
| 2018/0254810 A1 | 9/2018 | Kim et al. | |
| 2019/0182815 A1* | 6/2019 | Bang | H04B 7/06 |
| 2019/0349782 A1* | 11/2019 | Kim | H04W 16/28 |

OTHER PUBLICATIONS

Pei Zhou et al, Enhanced Random Access and Beam Training for Millimeter Wave Wireless Local Networks With High User Density, IEEE Transactions on Wireless Communications, vol. 16, No. 12, Dec. 2017, 14 Pages.

International Search Report issued in corresponding International Application No. PCT/CN2019/103976, dated Nov. 27, 2019, pp. 1-9.

Chinese Office Action issued in corresponding Chinese Application No. 201811076944.1, dated May 6, 2022, pp. 1-12.

\* cited by examiner

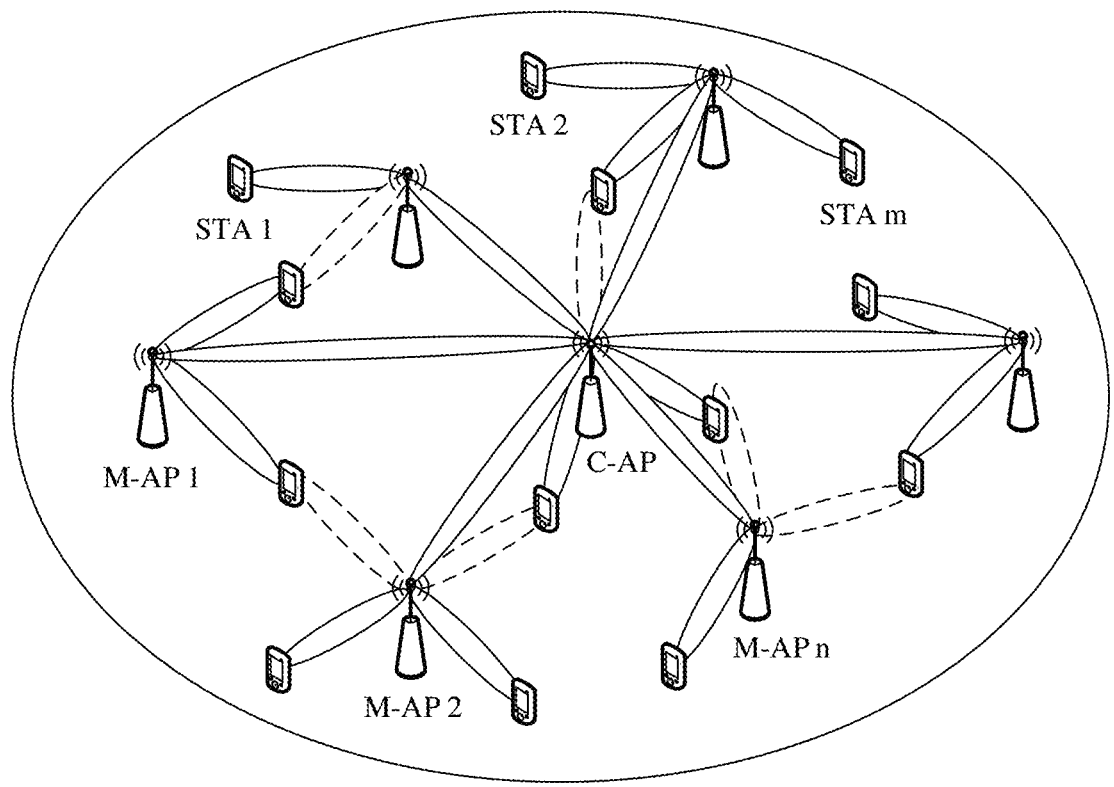

| A first access point AP determines first information, where the first information is used to indicate an association beamforming training A-BFT time period, the A-BFT time period is used to perform A-BFT between a plurality of APs and a station STA within coverage of the plurality of APs, and the plurality of APs include the first AP and at least one second AP | ∿ S310 |

| The first AP sends the first information | ∿ S320 |

FIG. 3

| Element ID | Length | SSW period duration or FSS | Exchanging period duration (optional) | Forwarding frame duration (optional) | New SSW FBCK frame duration (optional) | A-BFT start time (optional) | A-BFT length | Slot duration |
|---|---|---|---|---|---|---|---|---|
| 1 | 1 | 1 | 1 | 1 | 1 | 1 | 1 | 1 |

A-BFT scheduling element

Octet:

FIG. 5

BEAM TRAINING METHOD AND APPARATUS

CROSS-REFERENCE TO RELATED APPLICATIONS

This application is a continuation of International Application No. PCT/CN2019/103976, filed on Sep. 2, 2019, which claims priority to Chinese Patent Application No. 201811076944.1, filed on Sep. 14, 2018. The disclosures of the aforementioned applications are hereby incorporated by reference in their entireties.

TECHNICAL FIELD

This application relates to the communications field, and more specifically, to a beam training method and apparatus.

BACKGROUND

A 60 GHz millimeter-wave band has abundant available spectrum resources, but signal attenuation is very severe due to an increase in a path loss. Therefore, a directional communication technology using beamforming (BF) is introduced in 60 GHz millimeter wave communication, to provide a transmit antenna gain or a receive antenna gain to overcome the signal attenuation. When a beamforming technology is used, beamforming training (BFT) needs to be first performed. A BFT process may be specifically a process of aligning a receive beam with a transmit beam between a personal basic service set control point (PBSS control point, PCP)/access point (AP) and a station (STA).

The PCP/AP sends a directional multi-gigabit (DMG) beacon (beacon) frame in each direction in a beacon transmission interval (BTI) of a beacon interval (BI). A STA that receives the beacon frame randomly selects a slot for access in a subsequent association beamforming training (A-BFT) phase. The A-BFT phase is mainly used to complete transmit beam training of the STA. A common mechanism is that association beamforming training is performed between one AP and a plurality of STAs. For a scenario in which there are a plurality of APs and a plurality of STAs, how to control the plurality of APs and the plurality of STAs to perform association beamforming training has become an urgent technical problem to be resolved.

SUMMARY

This application provides a beam training method and apparatus, to control a plurality of APs and a plurality of STAs to perform association beamforming training.

According to a first aspect, a beam training method is provided, including: A first access point AP determines first information. The first information is used to indicate an association beamforming training A-BFT time period, the A-BFT time period is used to perform A-BFT between a plurality of APs and a station STA within coverage of the plurality of APs, and the plurality of APs include the first AP and at least one second AP. The first AP sends the first information.

According to the beam training method in this embodiment of this application, the first AP sends the first information to configure the A-BFT time period in which the association beamforming training is performed between the plurality of APs and the STA, so that the plurality of APs and the STA within the coverage of the plurality of APs perform beam training according to an indication in the A-BFT time period indicated by using the first information, and the plurality of APs and a plurality of STAs can be controlled to perform association beamforming training, thereby improving system performance.

It should be understood that in another possible implementation of this application, the first AP may not participate in the association beamforming training. Specifically, in the A-BFT time period, the at least one second AP in the plurality of APs receives a sector sweep frame sent by the STA, and performs measurement to obtain a sector selection result, the at least one second AP sends the sector selection result to the first AP for summarization, and the first AP sends a summarized sector selection result to the STA. In this case, the first AP serves only as a management node, and is responsible for collecting and distributing information.

In this embodiment of this application, the A-BFT time period may be shared by the plurality of APs in a BPAC, or the A-BFT time period may be divided into a plurality of A-BFT time sub-periods. The plurality of A-BFT time sub-periods may be separately associated with at least one of the plurality of APs, in other words, a fixed A-BFT time sub-period is obtained through division for each AP. This is not limited in this embodiment of this application.

With reference to the first aspect, in some implementations of the first aspect, the A-BFT time period is used by any STA within the coverage of the plurality of APs to perform sector sweep.

Specifically, the A-BFT time period indicated by using the first information may be used by the any STA within the coverage of the plurality of APs to perform the sector sweep, in other words, the A-BFT time period is shared by the STA covered by the plurality of APs. For a specific first STA, the first STA determines, based on the first information, the A-BFT time period as the time period that may be used by the first STA to perform the sector sweep. Further, the first STA may contend for an A-BFT slot in the time period that may be used by the first STA to perform the sector sweep, and if the first STA obtains the A-BFT slot through contention, the first STA can successfully perform access. Optionally, the first STA randomly selects an A-BFT slot from a plurality of A-BFT slots included in the A-BFT time period, to send a sector sweep frame. If there is no receiving conflict on an AP side because no other STA performs access in the A-BFT slot, in other words, the AP side can distinguish between sector sweep frames because a plurality of STAs do not simultaneously send the sector sweep frames in the A-BFT slot, it indicates that the first STA obtains the A-BFT slot through contention, and can successfully perform the access.

In this embodiment of this application, the A-BFT time period is shared by the STA covered by the plurality of APs. For a specific STA, there are a relatively large quantity of A-BFT slots that may be used by the STA to perform sector sweep, so that the STA more flexibly selects, in a wider range, an A-BFT slot for access, and this can avoid a slot waste problem caused by uneven distribution of STAs within the coverage of the plurality of APs, thereby helping improve resource utilization.

With reference to the first aspect, in some implementations of the first aspect, the A-BFT time period includes the plurality of A-BFT time sub-periods, each of the plurality of A-BFT time sub-periods corresponds to at least one of the plurality of APs, and each A-BFT time sub-period is used by a STA within coverage of an AP corresponding to each A-BFT time sub-period to perform sector sweep.

Specifically, the A-BFT time period indicated by using the first information may be divided into a plurality of time periods, which are referred to as A-BFT time sub-periods in this embodiment of this application. Each A-BFT time sub-period may include one or more A-BFT slots, and quantities of A-BFT slots included in all the A-BFT time sub-periods may be equal or may not be equal. Each A-BFT time sub-period corresponds to the at least one AP in the BPAC, and is separately used by a STA within coverage of an AP corresponding to each A-BFT time sub-period to perform sector sweep.

In this embodiment of this application, the A-BFT time period is divided into the plurality of A-BFT time sub-periods, and the A-BFT time sub-period is separately associated with the at least one of the plurality of APs, and is used for access of a STA within coverage of a fixed AP. This can avoid, to some extent, a case in which the STAs select a same A-BFT slot for access, thereby helping improve a success rate of STA access.

In a possible implementation, one A-BFT time sub-period corresponds to one AP, and a corresponding sequence of the A-BFT time sub-period and the AP is the same as a sequence in which the AP sends a beacon frame in a BTI. A sequence in which the A-BFT time sub-period corresponds to each AP may be predefined when the AP sends a beacon frame.

It should be understood that in a possible design, the plurality of A-BFT time sub-periods in the A-BFT time period may be agreed on in a protocol, so that all APs and STAs in a communications system can learn of both slots and APs that correspond to the A-BFT time sub-periods. In another possible design, the plurality of A-BFT time sub-periods in the A-BFT time period may be determined by the first AP, and are notified to the STA by using signaling, so that the STA selects a corresponding slot for access. This is not limited in this embodiment of this application.

It should be further understood that whether the A-BFT time period is shared by all the APs or is divided into the plurality of A-BFT time sub-periods that each correspond to a fixed AP may be agreed on in a protocol, or may be configured by the first AP for the STA by using signaling. This is not limited in this embodiment of this application either. In a possible implementation, the signaling may include an indicator bit, and the indicator bit is used to indicate whether the A-BFT time period is divided into the plurality of A-BFT time sub-periods. For example, if the indicator bit of being 0 indicates that the A-BFT time period is not divided into the plurality of A-BFT time sub-periods, a STA receiving the signaling may select any slot for access from the A-BFT time period; or if the indicator bit of being 1 indicates that the A-BFT time period is divided into the plurality of A-BFT time sub-periods, a STA receiving the signaling may select a slot for access only from a corresponding A-BFT time sub-period.

With reference to the first aspect, in some implementations of the first aspect, the first information is further used to indicate at least one of the following information: a first time period occupied by the STA to perform the sector sweep; a second time period occupied by the at least one second AP to send second information, where the second information is used to indicate a first sector selection result, and the first sector selection result is obtained by performing sector sweep in the first time period; and a third time period occupied by the first AP and/or the at least one second AP to send third information, where the third information is used to indicate a second sector selection result of the at least one second AP, and the second sector selection result includes all or a part of the first sector selection result of the at least one second AP.

It should be understood that the first AP may configure a different first time period, a different second time period, and/or a different third time period for each STA to perform association beamforming training by using the first information. Because each STA has a different capability, for example, a quantity of sectors and a transmit power, this configuration manner is more flexible based on an actual situation. Alternatively, the first AP may configure a same first time period, a same second time period, and/or a same third time period for each STA to perform association beamforming training by using the first information. This configuration manner helps reduce related signaling overheads, and can simplify a beam training process.

With reference to the first aspect, in some implementations of the first aspect, the first information is further used to indicate a first time period occupied by the STA to perform the sector sweep; and after the first AP sends the first information, the method further includes: The first AP receives a sector sweep frame that is sent by a STA within coverage of the first AP in the first time period.

Specifically, the STA may select a corresponding slot based on a configuration, send the sector sweep frame in the slot according to an indication of the first information, where the sector sweep frame is used by the AP to perform measurement, and obtain a first sector selection result. The first sector selection result may be referred to as a responder transmit sector sweep selection result. The sector sweep frame may further include an initiator transmit sector sweep selection result that is obtained by the STA by measuring the beacon frame sent by the AP.

With reference to the first aspect, in some implementations of the first aspect, the first information is further used to indicate a second time period occupied by the at least one second AP to send second information; and the method further includes: The first AP receives the second information that is sent by the at least one second AP in the second time period. The second information is used to indicate a first sector selection result, and the first sector selection result is obtained by performing sector sweep in the first time period.

The second AP may receive sector sweep frames sent by the plurality of STAs, and measure the sector sweep frames, to obtain the first sector selection result. The second information may include information about the plurality of STAs, where the information includes an identifier of each of the plurality of STAs, identification information of the at least one, of the plurality of APs, that corresponds when each STA performs sector sweep, and a first sector selection result of the at least one, of the plurality of APs, corresponding to each STA.

Optionally, the second information may further include a quantity of STAs corresponding to the second information.

With reference to the first aspect, in some implementations of the first aspect, the first information is further used to indicate a third time period occupied by the first AP and/or the at least one second AP to send third information; and the method further includes: The first AP sends the third information to the at least one second AP in the third time period based on the second information, so that the at least one second AP sends the third information to the STA; or the first AP sends the third information to the STA in the third time period. The third information is used to indicate a second sector selection result of the at least one second AP, and the second sector selection result includes all or a part of the first sector selection result of the at least one second AP.

Specifically, in the BPAC, the first AP may use the following two different beam training processes based on different communication environments. Process 1: The first AP may arrange and summarize the received second information, and send the third information to the second AP in the third time period according to an indication of the first information. The second AP receives the third information, and forwards the third information to a STA within coverage of the second AP. Process 2: The first AP may arrange and summarize the received second information, and send the third information to the STA in the third time period according to an indication of the first information.

In a possible implementation, the process 1 may be used in a case in which the first AP cannot communicate with all the STAs, and the process 2 may be used in a case in which the first AP can communicate with all the STAs. However, it should be understood that, in this embodiment of this application, the beam training method in the process 1 is still used when the first AP can communicate with all the STAs.

With reference to the first aspect, in some implementations of the first aspect, that the first AP sends the first information includes: The first AP broadcasts a beacon frame that carries the first information; and/or the first AP sends the first information to the at least one second AP, so that the at least one second AP broadcasts a beacon frame that carries the first information.

Specifically, in the beacon transmission interval BTI, the plurality of APs may sequentially send beacon frames in all directions, so that the STA within the coverage of the plurality of APs performs the association beamforming training based on the beacon frames. The beacon frame may be a DMG beacon frame, or may be an EDMG beacon frame. This is not limited in this embodiment of this application. In this embodiment of this application, the first information may be sent through the beacon frame. In a possible implementation, the first AP may broadcast the beacon frame that carries the first information, and the STA within the coverage of the first AP may obtain the first information. This manner may be used in a case in which the first AP can cover all or most of the STAs in the BPAC. In another possible implementation, the first AP may send the first information to the at least one second AP. In this way, the first AP and the at least one second AP may broadcast the beacon frame that carries the first information, so that the STA in the BPAC obtains the first information, and performs the beam training based on the A-BFT time period indicated by using the first information. This manner may be used in a case in which the first AP cannot cover all the STAs in the BPAC.

According to a second aspect, a beam training method is provided, including: A first station STA receives first information. The first information is used to indicate an association beamforming training A-BFT time period, the A-BFT time period is used to perform A-BFT between a plurality of APs and a STA within coverage of the plurality of APs, the plurality of APs include a first AP and at least one second AP, and the STA includes the first STA. The first STA determines, based on the first information, a time period for performing sector sweep.

According to the beam training method in this embodiment of this application, the first AP sends the first information to configure the A-BFT time period in which the association beamforming training is performed between the plurality of APs and the STA, so that the plurality of APs and the STA within the coverage of the plurality of APs perform beam training according to an indication in the A-BFT time period indicated by using the first information, and the plurality of APs and a plurality of STAs can be controlled to perform association beamforming training, thereby improving system performance.

With reference to the second aspect, in some implementations of the second aspect, the A-BFT time period is used by any STA within the coverage of the plurality of APs to perform sector sweep; and that the first STA determines, based on the first information, a time period for performing sector sweep includes: The first STA determines, based on the first information, the A-BFT time period as the time period that may be used by the first STA to perform the sector sweep.

With reference to the second aspect, in some implementations of the second aspect, the A-BFT time period includes a plurality of A-BFT time sub-periods, each of the plurality of A-BFT time sub-periods corresponds to at least one of the plurality of APs, and each A-BFT time sub-period is used by a STA within coverage of an AP corresponding to each A-BFT time sub-period to perform sector sweep; and that the first STA determines, based on the first information, a time period for performing sector sweep includes: The first STA determines, based on the first information as the time period that may be used by the first STA to perform the sector sweep, an A-BFT sub-time period that is in the A-BFT time period and that corresponds to an AP covering the first STA.

With reference to the second aspect, in some implementations of the second aspect, the first information is further used to indicate a first time period occupied by the first STA to perform the sector sweep; and after the first STA determines, based on the first information, the time period for performing the sector sweep, the method further includes: The first STA sends a sector sweep frame in the first time period.

With reference to the second aspect, in some implementations of the second aspect, the first information is further used to indicate a second time period occupied by the at least one second AP to send second information, the second information is used to indicate a first sector selection result, and the first sector selection result is obtained by performing sector sweep in the first time period.

With reference to the second aspect, in some implementations of the second aspect, the first information is further used to indicate a third time period occupied by the first AP and/or the at least one second AP to send third information; and the method further includes: The first STA receives the third information that is sent by the first AP or the at least one second AP in the third time period. The third information is used to indicate a second sector selection result of the at least one second AP, and the second sector selection result includes all or a part of the first sector selection result of the at least one second AP.

With reference to the second aspect, in some implementations of the second aspect, that a first station STA receives first information includes: The first STA receives a beacon frame that is broadcast by the first AP and/or the at least one second AP and that carries the first information.

According to a third aspect, a beam training apparatus is provided, and is configured to perform the method in any one of the first aspect or the possible implementations of the first aspect. Specifically, the apparatus includes a unit configured to perform the method in any one of the first aspect or the possible implementations of the first aspect.

According to a fourth aspect, another beam training apparatus is provided, and is configured to perform the method in any one of the second aspect or the possible implementations of the second aspect. Specifically, the apparatus includes a unit configured to perform the method in any one of the second aspect or the possible implementations of the second aspect.

According to a fifth aspect, another beam training apparatus is provided. The apparatus includes a transceiver, a memory, and a processor. The transceiver, the memory, and the processor communicate with each other through an internal connection channel. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method in any one of the first aspect or the possible implementations of the first aspect.

According to a sixth aspect, another beam training apparatus is provided. The apparatus includes a transceiver, a memory, and a processor. The transceiver, the memory, and the processor communicate with each other through an internal connection channel. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method in any one of the second aspect or the possible implementations of the second aspect.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (read-only memory, ROM). The memory and the processor may be integrated on a same chip, or may be separately disposed on different chips. A type of the memory and a manner of disposing the memory and the processor are not limited in this embodiment of this application.

According to a seventh aspect, a beam training system is provided. The system includes the apparatus in any one of the third aspect or the possible implementations of the third aspect and the apparatus in any one of the fourth aspect or the possible implementations of the fourth aspect; or the system includes the apparatus in any one of the fifth aspect or the possible implementations of the fifth aspect and the apparatus in any one of the sixth aspect or the possible implementations of the sixth aspect.

According to an eighth aspect, a computer program product is provided. The computer program product includes computer program code; and when the computer program code is run on a computer, the computer is enabled to perform the methods in the foregoing aspects.

According to a ninth aspect, a computer-readable medium is provided, and is configured to store a computer program. The computer program includes an instruction used to perform the methods in the foregoing aspects.

According to a tenth aspect, a chip is provided, including a processor, configured to invoke, from a memory, and run an instruction stored in the memory, so that a communications device in which the chip is installed performs the methods in the foregoing aspects.

According to an eleventh aspect, another chip is provided, including an input interface, an output interface, a processor, and a memory. The input interface, the output interface, the processor, and the memory are connected to each other through an internal connection channel. The processor is configured to execute code in the memory. When the code is executed, the processor is configured to perform the methods in the foregoing aspects.

BRIEF DESCRIPTION OF DRAWINGS

FIG. 2 is a schematic diagram of a communications system according to an embodiment of this application;

FIG. 3 is a schematic flowchart of a beam training method according to an embodiment of this application;

FIG. 5 is a schematic structural diagram of an A-BFT scheduling element according to an embodiment of this application;

DESCRIPTION OF EMBODIMENTS

Figure 1:
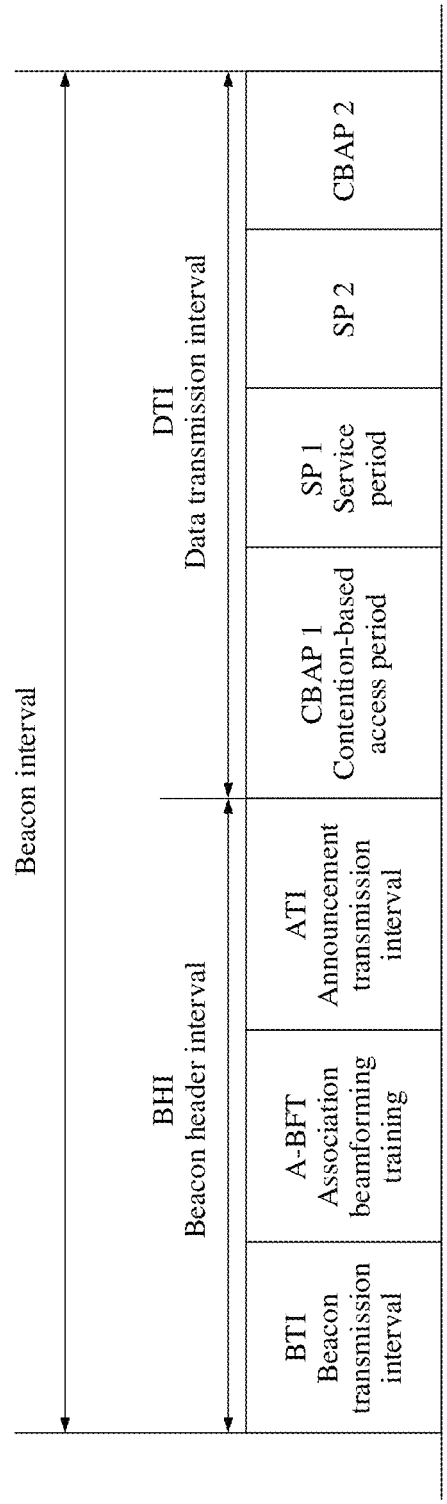
FIG. 1 is a schematic structural diagram of a beacon interval according to an embodiment of this application.

The following describes the technical solutions in this application with reference to the accompanying drawings.

It should be understood that the technical solutions in embodiments of this application may be used in various mobile communications systems, for example, a universal mobile telecommunication system (UMTS), a worldwide interoperability for microwave access (WiMAX) communications system, and a 5G communications system. The technical solutions in the embodiments of this application may be further used in a wireless local area network (WLAN), and the embodiments of this application is applicable to any protocol in the institute of electrical and electronics engineers (IEEE) 802.11 series protocols currently used for the WLAN.

The WLAN may include one or more basic service sets (BSS). Network nodes in the basic service set include an access point (AP) and a station (STA). Based on an original BSS, a personal basic service set (PBSS) and a personal basic service set control point (PBSS control point, PCP) are introduced in the IEEE 802.11ad. Each basic service set may include one AP/PCP and a plurality of stations associated with the AP/PCP.

It should be understood that an initiating device in the embodiments of this application may also be referred to as an initiator, and a responding device may also be referred to as a responder. Details are not described below again.

Specifically, a WLAN is used as an example. In the embodiments of this application, the initiating device and the responding device each are a device having a wireless communication function, and may be a user station (STA) in the WLAN. The user station may also be referred to as a user unit, an access terminal, a mobile station, a mobile console, a remote station, a remote terminal, a mobile device, a user terminal, a terminal, a wireless communications device, a user agent, a user apparatus, or user equipment (UE). The STA may be a cellular phone, a cordless phone, a session initiation protocol (SIP) phone, a wireless local loop (WLL) station, a personal digital assistant (PDA), a handheld device having a wireless local area network (for example, Wi-Fi) communication function, a computing device, or another processing device connected to a wireless modem.

In addition, the initiating device and the responding device each in the embodiments of this application may alternatively be an AP/PCP in the WLAN. The AP/PCP may be configured to: communicate with an access terminal through the wireless local area network, and transmit data of the access terminal to a network side, or transmit data from a network side to the access terminal.

The AP/PCP may be specifically a directional multigigabit (DMG) AP/PCP and an enhanced directional multigigabit (EDMG) AP/PCP. However, this is not limited in the embodiments of this application.

For ease of understanding and description, as an example instead of a limitation, the following describes an execution process and actions of a beam training method and apparatus in a WLAN system in this application.

The following first describes terms used in this application.

1. Beacon Interval (BI)

FIG. 1 is a schematic structural diagram of a beacon interval BI. As shown in FIG. 1, the beacon interval comprises a beacon header interval (BHI) and a data transmission interval (DTI). The BHI further includes a beacon transmission interval (BTI), association beamforming training (A-BFT), and an announcement transmission interval (ATI).

Specifically, a PCP/AP sends a plurality of beacon (beacon) frames in the BTI based on a sector number, where the beacon frames are used for downlink sector sweep. The A-BFT is used by a STA to perform association and uplink sector sweep. The ATI is used by the PCP/AP to poll the STA for buffered data information and allocate a resource in the data transmission interval (DTI) to the STA. The entire DTI is divided into several subintervals, and the subintervals are divided into a contention-based access period (CBAP) and a service period (SP) based on an access form. In the service period, scheduling transmission is performed, and contention does not need to be performed.

2. Sector Level Sweep (SLS) Phase

The SLS phase includes the following four parts:

an initiator sector sweep (ISS) phase, used to train a directional transmit beam of an initiator, where the initiator directionally sends training data by using a beam of a specific width, and a responder receives the training data in a quasi-omnidirectional manner;

a responder sector sweep (RSS) phase, used to train a directional transmit beam of the responder, where the responder directionally sends training data by using a beam of a specific width, and the training data includes optimal transmit sector information of the initiator in a previous phase; and in this case, the initiator receives the training data in a quasi-omnidirectional manner;

a sector sweep feedback (SSW-Feedback) phase, where feedback information is a list of initiator transmit sectors that are sorted based on sector quality and includes an optimal sector of the responder in the previous phase, and in this case, the responder is in a quasi-omnidirectional receiving mode; and a sector sweep acknowledgment (SSW-ACK) phase, where when SLS is performed before a data transmission interval (DTI) phase, the SSW-ACK phase may not exist; and when SLS is performed in the DTI phase, the SSW-ACK phase is required. In the SSW-ACK phase, the responder feeds back a list of responder transmit sectors that are sorted based on quality.

It should be understood that an omnidirectional antenna is used by a device to perform omnidirectional sending or omnidirectional receiving. The omnidirectional antenna radiates evenly at 360 degrees in a horizontal direction, that is, has no directivity, and has a beam with a specific width in a vertical direction. Usually, a smaller lobe width indicates a larger gain. The omnidirectional antenna covers a large area and is usually used for a station in a suburban area in a communications system. Correspondingly, a directional antenna is used by the device to perform directional sending or directional receiving, and radiates within a specific angle range in a horizontal direction, that is, has directivity. Similar to the omnidirectional antenna, a smaller lobe width indicates a larger gain. The directional antenna is usually used in an environment of a long communication distance, small coverage, a high target density, and high frequency usage in the communications system.

3. Association Beamforming Training (A-BFT) Phase

The A-BFT phase exists within a beacon interval (BI) and corresponds to an SLS phase in a beamforming process. Responder sector sweep (RSS) and sector sweep feedback (SSW-Feedback) operations are performed in the A-BFT phase.

Specifically, a PCP/AP sends a beacon frame in each direction in a beacon transmission interval (BTI). An A-BFT length field in the frame is used to indicate total slot duration in the A-BFT phase. A STA that receives the frame randomly selects a slot for access in the subsequent A-BFT phase, and then sends a sector sweep (SSW) frame or a short sector sweep (short SSW, SSSW) frame. The PCP/AP performs quasi-omnidirectional receiving in the A-BFT phase. Therefore, the A-BFT phase is mainly used to complete transmit beam training of the STA.

FIG. 2 is a schematic diagram of a communications system according to an embodiment of this application. As shown in FIG. 2, in the communications system, an AP cluster includes a plurality of APs, an AP in the plurality of APs is a coordination node (coordination AP, C-AP) of the AP cluster, and a remaining AP plays a role as a member node (member AP, M-AP) in a subsequent beam training process. As a manager of the AP cluster, the C-AP can distinguish between the M-APs and allocate an identifier (identifier, ID) to each M-AP. For the plurality of APs, one or more STAs further exist within coverage of all or a part of the APs. Specifically, in the communications system shown in FIG. 2, there is one C-AP, n M-APs, and m STAs in total in the communications system, and both m and n are integers greater than or equal to 1.

It should be understood that the communications system may be directed at a moving scenario, or may be directed at a non-moving scenario. In other words, the STA may be mobile, or may be fixed. Therefore, when a STA can move, a quantity of STAs within coverage of an AP may change in real time. In other words, there may be a moment at which an AP does not cover any STA. This is not limited in this embodiment of this application.

A set including a plurality of access points APs may be referred to as a personal basic service set control point/access point cluster (BSS PCP/AP cluster, BPAC). The BPAC corresponds to a scenario in which the plurality of APs exist. In the BPAC, one coordination access point (C-AP) coordinates another member access point (M-AP). The M-AP is considered as a distributed antenna of the C-AP, and the plurality of APs provide a service for one or more STAs. Therefore, in this application, the AP is also referred to as an antenna. An antenna identifier mentioned in this application is an AP identifier, and a quantity of antennas is a quantity of APs. In addition, the BPAC may correspond to a millimeter-wave network scenario, or may correspond to a high-frequency scenario, or may correspond to another scenario in which beam training needs to be performed. This is not limited in this embodiment of this application.

It should be understood that the C-AP and the M-AP are merely names used to distinguish between the coordination access point and the another member access point. The C-AP and the M-AP may further have other names. This is not limited in this embodiment of this application. For example, the C-AP may also be referred to as a first AP, and the M-AP may also be referred to as a second AP. For another example, the C-AP may also be referred to as a primary AP, and the M-AP may also be referred to as a secondary AP. In addition, the BPAC is merely a term used in this specification for ease of description, and the BPAC may further have another name. This is not limited in this embodiment of this application.

In the communications system, because data transmission needs to be performed by using a beamforming technology, beam training needs to be performed between each AP and each STA before the data transmission. Considering that an existing single-AP and multi-STA association beam training method cannot be directly used in a multi-AP and multi-STA scenario, the embodiments of this application provide a new method for association beamforming training between a plurality of APs and a plurality of STAs.

FIG. 3 is a schematic flowchart of a beam training method 300 according to an embodiment of this application. The method 300 may be used in the communications system 200 shown in FIG. 2. However, this embodiment of this application is not limited thereto.

S310: A first access point (AP) determines first information. The first information is used to indicate an association beamforming training (A-BFT) time period, the A-BFT time period is used to perform A-BFT between a plurality of APs and a station STA within coverage of the plurality of APs, and the plurality of APs include the first AP and at least one second AP.

S320: The first AP sends the first information.

Specifically, there is the first AP and the at least one second AP in the plurality of APs included in a BPAC. The first AP corresponds to the C-AP in FIG. 2, and the at least one second AP corresponds to the n M-APs in FIG. 2. It should be understood that the at least one second AP specifically represents one second AP or a plurality of second APs. For a specific AP in the plurality of APs, there may be a specific quantity of STAs within coverage of the AP. In this application, it is assumed that there are a total of m STAs in the BPAC, and the m STAs are separately located within coverage of different APs. The first AP may send the first information, to indicate a time period in which the plurality of APs and a plurality of STAs in the BPAC perform association beamforming training, where the time period is referred to as the A-BFT time period in this application, so that the at least one second AP and the STA can perform association beamforming training based on the first information in a corresponding A-BFT time period.

It should be understood that the first information may be carried in an existing frame as an element, or may be carried in a newly defined frame. This is not limited in this embodiment of this application. In a possible implementation, the first AP may broadcast the first information. Further, the first information may be carried in a beacon frame that needs to be broadcast by the first AP.

Therefore, according to the beam training method in this embodiment of this application, the first AP sends the first information to configure the A-BFT time period in which the association beamforming training is performed between the plurality of APs and the STA, so that the plurality of APs and the STA within the coverage of the plurality of APs perform beam training according to an indication in the A-BFT time period indicated by using the first information, and the plurality of APs and the plurality of STAs can be controlled to perform the association beamforming training, thereby improving system performance.

It should be understood that in another possible implementation of this application, the first AP may not participate in the association beamforming training. Specifically, in the A-BFT time period, the at least one second AP in the plurality of APs receives a sector sweep frame sent by the STA, and performs measurement to obtain a sector selection result, the at least one second AP sends the sector selection result to the first AP for summarization, and the first AP sends a summarized sector selection result to the STA. In this case, the first AP serves only as a management node, and is responsible for collecting and distributing information.

In an optional embodiment, that the first AP sends the first information includes:

The first AP broadcasts the beacon frame that carries the first information; and/or the first AP sends the first information to the at least one second AP, so that the at least one second AP broadcasts the beacon frame that carries the first information.

Specifically, in a beacon transmission interval BTI, the plurality of APs may sequentially send beacon frames in all directions, so that the STA within the coverage of the plurality of APs performs the association beamforming training based on the beacon frames. The beacon frame may be a DMG beacon frame, or may be an EDMG beacon frame. This is not limited in this embodiment of this application. In this embodiment of this application, the first information may be carried in the beacon frame for sending.

In a possible implementation, the first AP may broadcast the beacon frame that carries the first information, and a STA within coverage of the first AP may obtain the first information. This manner may be used in a case in which the first AP can cover all or most of the STAs in the BPAC. In another possible implementation, the first AP may send the first information to the at least one second AP. In this way, the first AP and the at least one second AP may broadcast the beacon frame that carries the first information, so that the STA in the BPAC obtains the first information, and performs the beam training based on the A-BFT time period indicated by using the first information. This manner may be used in a case in which the first AP cannot cover all the STAs in the BPAC.

In an optional embodiment, the method further includes: A first station (STA) receives the first information, where the STA within the coverage of the plurality of APs includes the first STA; and the first STA determines, based on the first information, a time period for performing sector sweep.

Any STA in the BPAC is used as an example, and is referred to as the first STA in this specification. After the first AP and/or the at least one second AP send/sends the first information, the first STA may receive the first information, and determine, based on the first information, the time period for performing the sector sweep. It should be understood that the A-BFT time period may comprise a plurality of A-BFT slots, and the time period for the sector sweep may be specifically one or more A-BFT slots in the A-BFT phase shown in FIG. 1.

Optionally, that a first station STA receives the first information includes: The first STA receives the beacon frame that is broadcast by the first AP or the at least one second AP and that carries the first information.

Specifically, if the first STA is within the coverage of the first AP, the first STA may receive the first information sent by the first AP; or if the first STA is within coverage of a second AP, the first STA may receive the first information sent by the second AP. This is not limited in this embodiment of this application.

In this embodiment of this application, the A-BFT time period may be shared by the plurality of APs in the BPAC, or the A-BFT time period may be divided into a plurality of A-BFT time sub-periods. The plurality of A-BFT time sub-periods may be separately associated with at least one of the plurality of APs, in other words, a fixed A-BFT time sub-period is obtained through division for each AP. This is not limited in this embodiment of this application.

In an optional embodiment, the A-BFT time period is used by any STA within the coverage of the plurality of APs to perform sector sweep.

Specifically, the A-BFT time period indicated by using the first information may be used by the any STA within the coverage of the plurality of APs to perform the sector sweep. In other words, the A-BFT time period is shared by the STAs covered by the plurality of APs. Correspondingly, that the first STA determines, based on the first information, a time period for performing sector sweep includes: The first STA determines, based on the first information, the A-BFT time period as the time period that may be used by the first STA to perform the sector sweep.

Further, the first STA may contend for an A-BFT slot in the time period that may be used by the first STA to perform the sector sweep, and if the first STA obtains the A-BFT slot through contention, the first STA can successfully perform access. Optionally, the first STA randomly selects an A-BFT slot from the plurality of A-BFT slots included in the A-BFT time period, to send a sector sweep frame. If there is no receiving conflict on an AP side because no other STA performs access in the A-BFT slot, in other words, the AP side can distinguish between sector sweep frames because a plurality of STAs do not simultaneously send the sector sweep frames in the A-BFT slot, it indicates that the first STA obtains the A-BFT slot through contention, and can successfully perform the access.

In this embodiment of this application, the A-BFT time period is shared by the STAs covered by the plurality of APs. For a specific STA, there are a relatively large quantity of A-BFT slots that may be used by the STA to perform sector sweep, so that the STA more flexibly selects, in a wider range, an A-BFT slot for access, and this can avoid a slot waste problem caused by uneven distribution of STAs within the coverage of the plurality of APs, thereby helping improve resource utilization.

In another optional embodiment, the A-BFT time period includes the plurality of A-BFT time sub-periods, each of the plurality of A-BFT time sub-periods corresponds to the at least one of the plurality of APs, and each A-BFT time sub-period is used by a STA within coverage of an AP corresponding to each A-BFT time sub-period to perform sector sweep.

Correspondingly, that the first STA determines, based on the first information, a time period for performing sector sweep includes: The first STA determines, based on the first information, as the time period that may be used by the first STA to perform the sector sweep, an A-BFT time sub-period that is in the A-BFT time period and that corresponds to an AP covering the first STA.

Specifically, the A-BFT time period indicated by using the first information may be divided into a plurality of time periods, which are referred to as A-BFT time sub-periods in this embodiment of this application. Each A-BFT time sub-period may include one or more A-BFT slots, and quantities of A-BFT slots included in all the A-BFT time sub-periods may be equal or may not be equal. Each A-BFT time sub-period corresponds to the at least one AP in the BPAC, and is separately used by the STA within the coverage of the AP corresponding to each A-BFT time sub-period to perform the sector sweep.

For example, an AP 1 in a plurality of APs corresponds to an A-BFT time sub-period 1, and the A-BFT time sub-period 1 includes an A-BFT slot 0, an A-BFT slot 1, and an A-BFT slot 2. An AP 2 in the plurality of APs corresponds to an A-BFT time sub-period 2, and the A-BFT time sub-period 2 includes an A-BFT slot 3, an A-BFT slot 4, and an A-BFT slot 5. A STA 1 is located within coverage of the AP 1, and may perform sector sweep in the A-BFT time sub-period 1 corresponding to the AP 1, to be specific, the STA 1 may select the A-BFT slot 0, the A-BFT slot 1, and the A-BFT slot 2 for access, and send a sector sweep frame. A STA 2 is located within coverage of the AP 2, and may perform sector sweep in the A-BFT time sub-period 2 corresponding to the AP 2, to be specific, the STA 2 may select the A-BFT slot 3, the A-BFT slot 4, and the A-BFT slot 5 for access, and send a sector sweep frame. Therefore, such division avoids a case in which the STA 1 and the STA 2 select a same A-BFT slot for access, and avoids a beam training failure caused by a conflict between sector sweep frames sent by the STA 1 and the STA 2.

In this embodiment of this application, the A-BFT time period is divided into the plurality of A-BFT time sub-periods, and the A-BFT time sub-period is separately associated with the at least one of the plurality of APs, and is used for access of a STA within coverage of a fixed AP. This can avoid, to some extent, a case in which the STAs select a same A-BFT slot for access, thereby helping improve a success rate of STA access.

Figure 4:
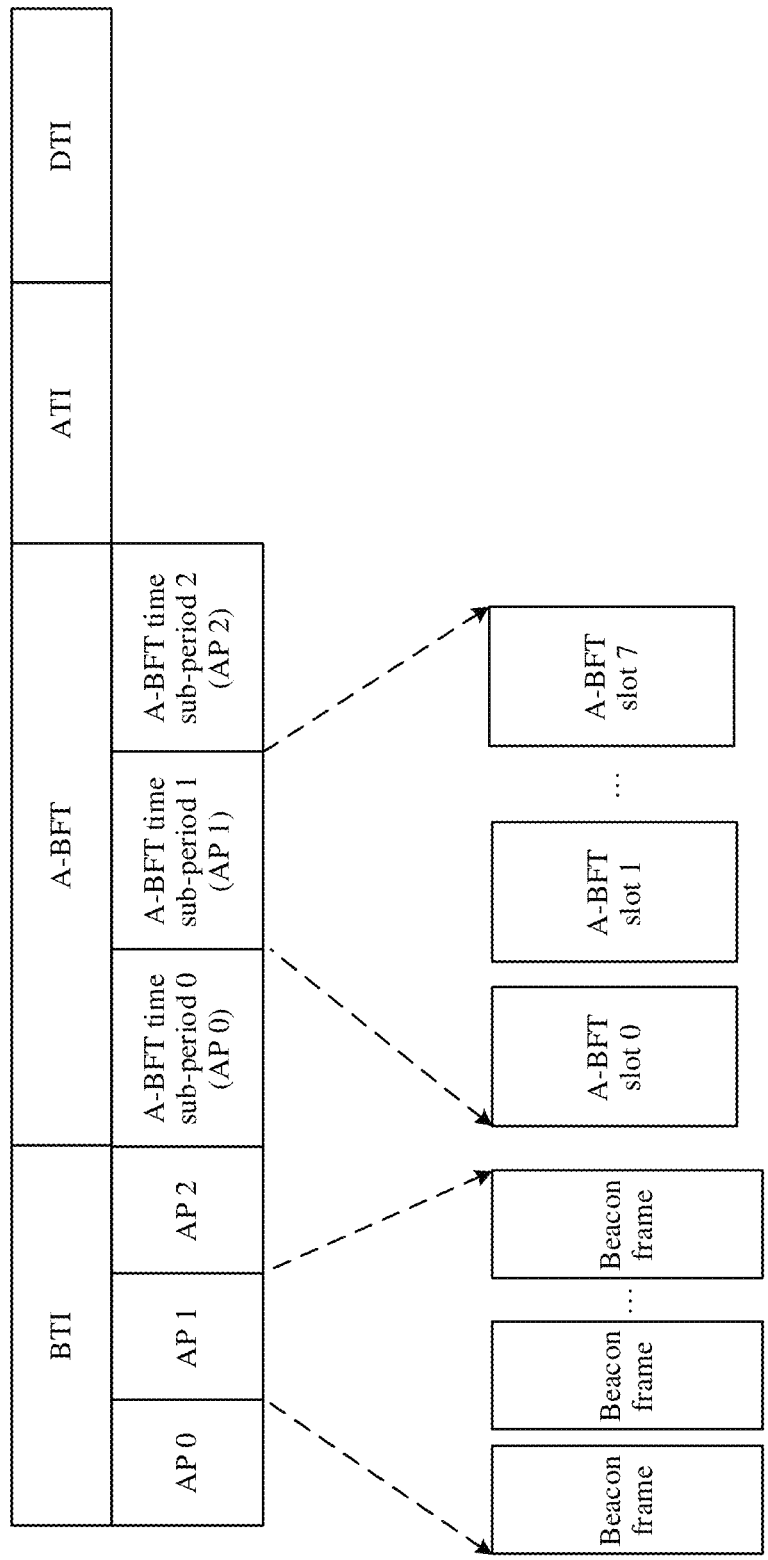
FIG. 4 is a schematic diagram of division of an A-BFT time period according to an embodiment of this application.

In a possible implementation, one A-BFT time sub-period corresponds to one AP, and a corresponding sequence of the A-BFT time sub-period and the AP is the same as a sequence in which the AP sends a beacon frame in a BTI. FIG. 4 is a schematic diagram of division of an A-BFT time period according to an embodiment of this application. As shown in FIG. 4, it is assumed that there are three APs: an AP 0, an AP 1, and an AP 2, and a sequence of sending beacon frames by the three APs in a BTI is the AP 0, the AP 1, and the AP 2. In this case, the A-BFT time period is divided into three A-BFT time sub-periods: an A-BFT time sub-period 0, an A-BFT time sub-period 1, and an A-BFT time sub-period 2. The three A-BFT time sub-periods sequentially correspond to the AP 0, the AP 1, and the AP 2 in time sequence. If a STA receives a beacon frame sent by the AP 1, the STA may select a slot, for access, included in the A-BFT time sub-period 1 corresponding to the AP 1. In FIG. 4, the STA may select any one, for access, of a slot 0, a slot 1, . . . , and a slot 7 that are included in the A-BFT time sub-period 1. It should be understood that, in the foregoing embodiment, a sequence in which the A-BFT time corresponds to each AP is predefined when the AP sends a beacon frame.

It should be understood that in a possible design, the plurality of A-BFT time sub-periods in the A-BFT time period may be agreed on in a protocol, so that all APs and STAs in a communications system can learn of both slots and APs that correspond to the A-BFT time sub-periods. In another possible design, the plurality of A-BFT time sub-periods in the A-BFT time period may be determined by the first AP, and are notified to the STA by using signaling, so that the STA selects a corresponding slot for access. This is not limited in this embodiment of this application.

It should be further understood that whether the A-BFT time period is shared by all the APs or is divided into the plurality of A-BFT time sub-periods that each correspond to a fixed AP may be agreed on in a protocol, or may be configured by the first AP for the STA by using signaling. This is not limited in this embodiment of this application either. In a possible implementation, the signaling may include an indicator bit, and the indicator bit is used to indicate whether the A-BFT time period is divided into the plurality of A-BFT time sub-periods. For example, if the indicator bit of being 0 indicates that the A-BFT time period is not divided into the plurality of A-BFT time sub-periods, a STA receiving the signaling may select any slot for access from the A-BFT time period; or if the indicator bit of being 1 indicates that the A-BFT time period is divided into the plurality of A-BFT time sub-periods, a STA receiving the signaling may select a slot for access only from a corresponding A-BFT time sub-period.

In an optional embodiment, the first information is further used to indicate at least one of the following information:

a first time period occupied by the STA to perform the sector sweep;

a second time period occupied by the at least one second AP to send second information, where the second information is used to indicate a first sector selection result, and the first sector selection result is obtained by performing sector sweep in the first time period; and a third time period occupied by the first AP and/or the at least one second AP to send third information, where the third information is used to indicate a second sector selection result of the at least one second AP, and the second sector selection result includes all or a part of the first sector selection result of the at least one second AP.

Specifically, the first time period occupied when the STA performs the sector sweep is duration occupied when the STA sends a sector sweep frame. The sector sweep frame is used to perform sector sweep, and may be specifically an SSW frame. A phase in which the STA sends the sector sweep frame may be referred to as a sector sweep phase. Because the STA performs the sector sweep in the A-BFT time period, the first time period is within the A-BFT time period. For each STA, the first AP may configure a first time period of a same length, or may configure a first time period of a different length. This is not limited in this embodiment of this application.

The second time period occupied by the at least one second AP to send the second information is duration during which the at least one second AP performs information exchange (which is also referred to as an exchanging period in this specification). The information exchange may mean that the at least one second AP reports a collected sector selection result to the first AP, and the first AP performs summarization. The second time period may be within the A-BFT time period, or may be after the A-BFT time period. This is not limited in this embodiment of this application. Similarly, for each STA, the first AP may configure a second time period of a same length, or may configure a second time period of a different length. This is not limited in this embodiment of this application.

The third time period occupied by the first AP and/or the at least one second AP to send the third information is duration during which the first AP or the at least one second AP feeds back a sector selection result to the STA. The third time period may be within the A-BFT time period, or may be after the A-BFT time period. This is not limited in this embodiment of this application. Similarly, for each STA, the first AP may configure a third time period of a same length, or may configure a third time period of a different length. This is not limited in this embodiment of this application.

It should be understood that the first AP may configure a different first time period, a different second time period, and/or a different third time period for each STA to perform association beamforming training by using the first information. Because each STA has a different capability, for example, a quantity of sectors and a transmit power, this configuration manner is more flexible based on an actual situation. Alternatively, the first AP may configure a same first time period, a same second time period, and/or a same third time period for each STA to perform association beamforming training by using the first information. This configuration manner helps reduce related signaling overheads, and can simplify a beam training process.

In a possible implementation, the first information may be specifically referred to as an A-BFT scheduling element. FIG. 5 is a schematic structural diagram of an A-BFT scheduling element according to an embodiment of this application. As shown in FIG. 5, the A-BFT scheduling element includes the following fields:

(1) An element ID is an ID used to mark and distinguish an element.

(2) A length is used to indicate a length of the element.

(3) SSW period duration is used to indicate duration (namely, the first time period) occupied when the STA sends the sector sweep frame; or FSS is used to indicate a quantity of sector sweep frames that can be sent in one A-BFT slot in an A-BFT phase, and may be specifically obtained by subtracting 1 from the quantity of sector sweep frames. A value range of the FSS is 0 to 15. For example, FSS=3, indicating that four sector sweep frames can be sent in one A-BFT slot. The first time period may be obtained through calculation by using the quantity, of sector sweep frames, indicated by using the FSS and duration of the sector sweep frame.

(4) An A-BFT length is duration corresponding to an A-BFT time period.

(5) Slot duration is duration of each A-BFT slot.

Optionally, the A-BFT scheduling element may further include at least one of the following fields:

(6) Exchanging period duration is duration (namely, the second time period) occupied by the at least one second AP to send the second information, where the second information may be specifically referred to as an AP FBCK frame, so that the exchanging period duration may also be referred to as an AP FBCK frame duration.

(7) Forwarding frame duration is duration occupied by the first AP to send the third information (namely, the third time period).

(8) New SSW feedback frame duration is duration occupied by the at least one second AP to send the third information, where the third information may be specifically referred to as a new SSW FBCK frame.

(9) An A-BFT start time is a start time of the A-BFT time period, where the A-BFT time period is determined with reference to the A-BFT length. It should be understood that the A-BFT start time may be an end time at which the last AP in the at least one AP sends a beacon frame in the BTI.

In this embodiment of this application, the first information sent by the first AP to the STA may include only (1) to (5) in the foregoing fields, and the first information sent by the first AP to the at least one second AP may include (1) to (8) in the foregoing fields. In addition, when the STA cannot learn of the end time of the beacon frame of the last AP, the first information may include the foregoing field (9). However, this is not limited in this embodiment of this application.

It should be understood that, if a quantity of APs and a quantity of STAs are fixed and known, duration of a frame exchanged between the AP and the STA may be fixed. In this case, a slot duration field may be precisely designed. In addition, to simplify the process, corresponding SSW period duration in each A-BFT slot may be configured to be the same. When the at least one second AP feeds back a respective AP FBCK frame in a respective A-BFT slot, there are a plurality of pieces of exchanging period duration (namely, second time periods). Optionally, corresponding AP FBCK frame duration in each A-BFT slot may be configured to be the same.

For example, a start time of an A-BFT slot i may be calculated by using the following formula:

$$t\_(\text{slot}i)=t_1+i^*\text{SlotDur}.$$

When the at least one second AP feeds back the respective AP FBCK frame in the respective A-BFT slot, in the A-BFT slot i, a sending start time of an AP FBCK frame (namely, a sending start time of an AP FBCK frame of the first AP) may be calculated by using the following formula:

$$t\_(AP\ \text{FBACK1})=t_1+i^*\text{SlotDur}+T_1.$$

In the A-BFT slot i, a sending start time of an AP FBCK frame of a $j^{th}$ AP may be calculated by using the following formula:

$$t\_(AP\ \text{FBCK}j)=t_1+i^*\text{SlotDur}+T_1+j^*T_2, \text{ where}$$

i=0, 1, . . . , or N, j=0, 1, . . . , or n, N is a total quantity of slots included in the A-BFT time period, n is a total quantity of second APs, $t_1$ is a start time of A-BFT, SlotDur is preset slot duration, $T_1$ is SSW period duration, and $T_2$ is AP FBCK frame duration.

In this embodiment of this application, an identifier of an A-BFT slot starts from 0. To be specific, the first A-BFT slot of the A-BFT time period in this application is an A-BFT slot 0, the second A-BFT slot is an A-BFT slot 1, and so on. However, it should be understood that an identifier of an A-BFT slot may alternatively start from 1. This is not limited in this embodiment of this application. In this case, the foregoing formulas need to be properly adjusted.

In an optional embodiment, the first information is further used to indicate a first time period occupied by the STA to perform the sector sweep; and after that the first STA determines, based on the first information, a time period for performing sector sweep, the method further includes: The first STA sends a sector sweep frame in the first time period.

Correspondingly, after the first AP sends the first information, the method further includes: The first AP receives the sector sweep frame that is sent by the STA within coverage of the first AP in the first time period.

Specifically, the STA may select a corresponding slot based on a configuration, send the sector sweep frame in the slot according to an indication of the first information, where the sector sweep frame is used by the AP to perform measurement, and obtain a first sector selection result. The first sector selection result may be referred to as a responder transmit sector sweep selection result. The sector sweep frame may further include an initiator transmit sector sweep selection result that is obtained by the STA by measuring the beacon frame sent by the AP.

In a possible implementation, the sector sweep frame may be an SSW frame or an SSSW frame, and the SSW frame or the SSSW frame includes a selection result of one STA for one AP. In this case, if the STA receives beacon frames of a plurality of APs, the STA needs to send a plurality of SSW frames or a plurality of SSSW frames, to separately perform feedback.

In another possible implementation, the sector sweep frame may be a new SSW frame or a new SSSW frame, and the new SSW frame or the new SSSW frame may include a selection result of one STA for a plurality of APs. In other words, the new SSW frame or the new SSSW frame summarizes the foregoing plurality of SSW frames or the foregoing plurality of SSSW frames into one frame. In this way, signaling overheads of the STA can be reduced, and a training process is simplified.

In an optional embodiment, the first information is further used to indicate a second time period occupied by the at least one second AP to send second information; and the method further includes: The first AP receives the second information that is sent by the at least one second AP in the second time period.

Specifically, the second information is reported by a specific second AP, content of the second information includes a sector selection result obtained by measuring a sector sweep frame sent by a STA associated with the second AP, and a quantity of pieces of second information that the first AP needs to receive may be equal to a quantity of the at least one second AP. Specifically, the second information may include at least one of identification information of the STA, identification information of a part of APs that correspond when the STA performs the sector sweep, and a sector selection result of the part of APs corresponding to the STA. The part of APs herein are at least one of the plurality of APs, and may include the first AP, and may also include the second AP. This is not limited in this embodiment of this application. In other words, for a specific STA, a sector selection result fed back by the STA in a sector sweep frame includes a training result of the STA and an AP corresponding to a beacon frame that can be received, and the STA may receive a beacon frame sent by the first AP, or may receive a beacon frame sent by another second AP. This is not limited in this embodiment of this application.

The second information may be carried in an existing frame as an element, or may be carried in a newly defined frame. This is not limited in this embodiment of this application. Optionally, the second information may be specifically carried in an AP feedback (AP FBCK) frame. The AP FBCK frame may be a newly defined frame. Certainly, the frame may further have another name, for example, an AP report frame. This is not limited in this embodiment of this application.

It should be further understood that, the second AP may receive sector sweep frames sent by the plurality of STAs, and measure the sector sweep frames, to obtain the first sector selection result. The second information may include information about the plurality of STAs, where the information includes an identifier of each of the plurality of STAs, identification information of the at least one, of the plurality of APs, that corresponds when each STA performs sector sweep, and a first sector selection result of the at least one, of the plurality of APs, corresponding to each STA.

Optionally, the second information may further indicate a quantity of STAs corresponding to the second information.

In an optional embodiment, the first information is further used to indicate a third time period occupied by the first AP and/or the at least one second AP to send third information; and the method further includes: The first AP sends the third information to the at least one second AP in the third time period based on the second information, so that the at least one second AP sends the third information to the STA; or the first AP sends the third information to the STA in the third time period.

Correspondingly, the first STA receives the third information that is sent by the first AP or the at least one second AP in the third time period.

Specifically, in the BPAC, the first AP may use the following two different beam training processes based on different communication environments.

Process 1

The first AP may arrange and summarize the received second information, and send the third information to the second AP in the third time period according to an indication of the first information. The second AP receives the third information, and forwards the third information to a STA within coverage of the second AP.

Process 2

The first AP may arrange and summarize the received second information, and send the third information to the STA in the third time period according to an indication of the first information.

In a possible implementation, the process 1 may be used in a case in which the first AP cannot communicate with all the STAs, and the process 2 may be used in a case in which the first AP can communicate with all the STAs. However, it should be understood that, in this embodiment of this application, the beam training method in the process 1 is still used when the first AP can communicate with all the STAs.

It should be understood that the third information is used to indicate a second sector selection result of the at least one second AP, and the second sector selection result may include all or a part of the first sector selection result of the at least one second AP. In other words, for a specific second AP, the second sector selection result includes a sector selection result that is obtained by the second AP by measuring a sector sweep frame sent by a STA associated with the second AP. The sector sweep frame sent by the STA may include a training result of the STA and an AP corresponding to a beacon frame that can be received, and the training result may be obtained by the STA by measuring the beacon frame sent by the AP. After receiving sector sweep frames that are sent by second APs that need to perform feedback, the first AP may obtain a plurality of first sector selection results. The first AP integrates the plurality of first sector selection results, and the first AP may send an integrated result to the second APs, or may send only a sector selection result of an AP covering one or more STAs to the second AP. Therefore, the second sector selection result may include all or the part of the first sector selection results. This is not limited in this embodiment of this application.

The third information may be carried in an existing frame as an element, or may be carried in a newly defined frame. This is not limited in this embodiment of this application. Optionally, the third information may be specifically carried in a forwarding frame or a new sector sweep feedback (new SSW FBCK) frame. The forwarding frame or the new SSW FBCK frame may be a newly defined frame. Certainly, the frame may further have another name, for example, a feedback frame. This is not limited in this embodiment of this application.

In an optional embodiment, that the first AP receives the second information that is sent by the at least one second AP in the second time period includes: The first AP receives the second information that is fed back by the at least one second AP in a centralized manner after all the STAs send sector sweep frames.

Specifically, there are a plurality of second APs. For a second AP in the plurality of second APs, the second AP may receive, in an A-BFT slot, a sector sweep frame sent by the STA, measure the sector sweep frame to obtain the first sector sweep result, and then send, in the same A-BFT slot, the second information including the first sector sweep result to the first AP. Alternatively, after all the STAs send the sector sweep frames and the sector sweep frames are measured, the second AP may report, in a centralized manner, the second information including all first sector sweep results. This is not limited in this embodiment of this application.

It should be understood that, for an immediate reporting solution, one second AP sends a plurality of pieces of second information, the plurality of pieces of second information may correspond to a plurality of second time periods, duration of the plurality of second time periods may be the same or may be different, and one of the plurality of second time periods is a time period in which one AP reports second information. However, for a centralized reporting solution, one second AP may integrate, into one piece of second information for reporting, first sector sweep results obtained by measuring sector sweep frames sent by a plurality of STAs, the piece of second information only needs to correspond to one second time period, and the second time period is a centralized reporting time period. In this way, a feedback procedure can be simplified, reporting overheads are reduced.

For ease of understanding, the following describes this application in detail with reference to a specific embodiment by using an example in which the first AP is a C-AP and the second AP is an M-AP.

This embodiment may be used in the communications system shown in FIG. 2. In the communications system shown in FIG. 2, there is one C-AP, n M-APs, and m STAs. The C-AP performs management and coordination on the n M-APs, to complete beam training between the n+1 APs and the m STAs.

Before the beam training is performed, the C-AP may first establish a BPAC, that is, perform BPAC training. Specifically, the C-AP may sequentially send, in a BTI, a BPAC training request frame to each M-AP to query each M-AP about a specific time that may be used as a virtual AP cluster beamforming training service window (virtual cluster beamforming training service period, VCSP). Then, the M-AP may feed back a BPAC training response frame to the C-AP in a respective BTI. After negotiation is completed, the C-AP broadcasts a BPAC training acknowledgment frame in a next BTI, that is, broadcasts the VCSP to all the M-APs.

Optionally, a beam training sequence of the M-AP may be determined by using a cluster time offset of the M-AP. Specifically, in a process of establishing the BPAC, the M-AP negotiates with the C-AP to obtain a cluster time offset index of the M-AP, where the cluster time offset index specifies a sequence in which each M-AP sends a beacon frame in the BPAC, and therefore may be used as a basis for determining the beam training sequence of the M-AP.

After the BPAC training is completed, each M-AP knows a specific training sequence, and then performs association beamforming training in an A-BFT phase. A specific training process may be classified into the following several cases.

Case 1: A C-AP cannot directly communicate with all STAs.

Figure 6:
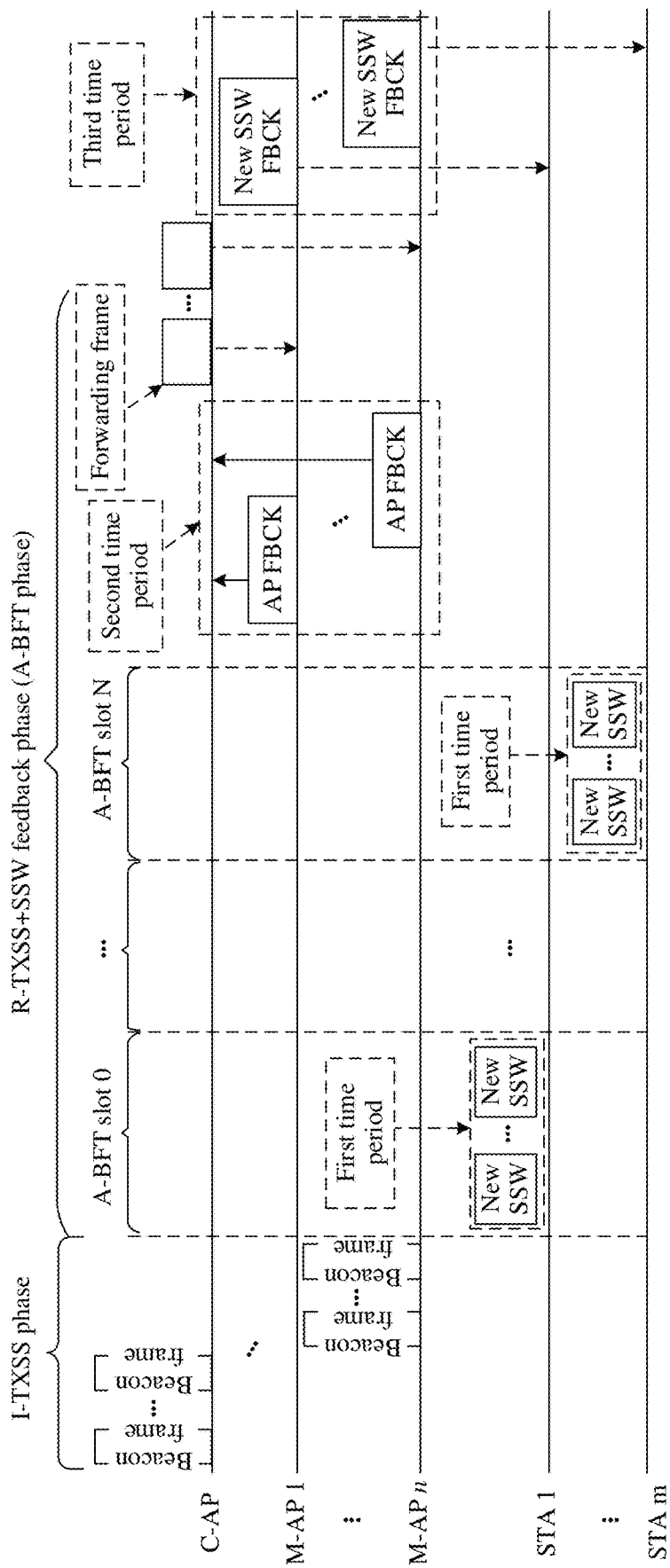
FIG. 6 is a schematic flowchart of basic service set control point/access point cluster BPAC-based A-BFT according to an embodiment of this application.

FIG. 6 is a schematic flowchart of A-BFT in which a C-AP cannot directly communicate with all STAs. FIG. 6 is used as an example. The beam training process includes two phases: initiator transmit sector sweep and A-BFT.

1. Initiator Transmit Sector Sweep (I-TXSS) Phase

The I-TXSS phase is in a BTI. In this phase, APs (including the C-AP and an M-AP) broadcast beacon frames, where a beacon frame broadcast by the C-AP may carry first information, used to indicate a specific time period in which the APs and the STA perform information transmission in a subsequent A-BFT phase. A beacon frame broadcast by the M-AP may carry the first information, or may not carry the first information. Correspondingly, a STA receiving the beacon frame may perform channel measurement to obtain an I-TXSS sector selection result. In this embodiment, the n+1 APs sequentially send beacon frames.

2. Responder Transmit Sector Sweep (R-TXSS) Phase and SSW Feedback Phase

The R-TXSS phase and the SSW feedback phase are in the A-BFT phase. In the R-TXSS phase, the STA may include a measurement result in a new SSW frame (namely, the foregoing sector sweep frame) that needs to be sent, and perform access after obtaining an A-BFT slot through contention. The sector sweep means that a transmitter divides a signal propagation area from a circular area into several sector areas, and sends training data once in each sector. For example, in FIG. 6, a STA 1 receives a beacon frame sent by at least one AP, and the STA 1 selects an A-BFT slot 0 from slots included in the A-BFT phase, and sends a NEW SSW frame in the A-BFT slot 0 based on a configured first time period. The NEW SSW frame may include a first sector selection result of the at least one AP corresponding to the beacon frame received by the STA 1.

The new SSW frame is sent by the STA, and includes a sector selection result obtained by the STA by measuring the beacon frame sent by the AP. Therefore, the NEW SSW frame may include the quantity of antennas (quantity of antennas), fed back by the STA and information (per antenna info) corresponding to each antenna. The information corresponding to each antenna may include a sector selection (sector select) result and a corresponding antenna index (antenna index).

It should be understood that, in a BPAC, the n+1 APs may be considered as one AP, and are distinguished by using antenna indexes. Therefore, the quantity of antennas may be replaced with a quantity of APs, the antenna index may be replaced with an AP index, and an antenna identifier may be replaced with an AP identifier. This is not limited in this embodiment of this application.

Figure 7:
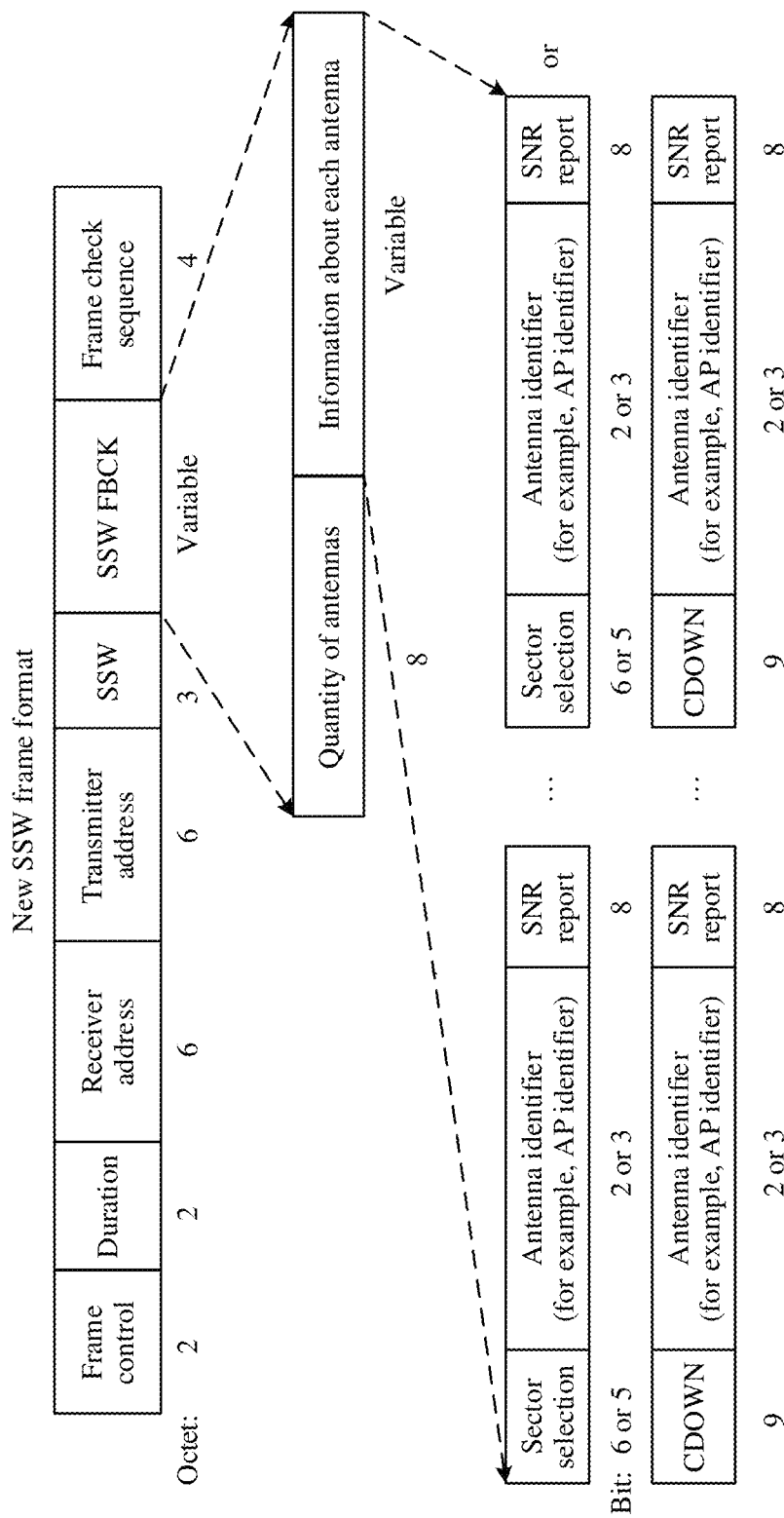
FIG. 7 is a schematic structural diagram of a new sector sweep frame (new SSW frame) according to an embodiment of this application.

In a possible implementation, a frame format of the new SSW frame is shown in FIG. 7. In this embodiment, an SSW FBCK part in an SSW frame is changed from three bytes of a fixed length to bytes of a variable length, to form the new SSW frame shown in FIG. 7.

The new SSW frame includes the following fields:

(1) Frame control: The first three subfields are a protocol version, a type, and subtype. A remaining subfield depends on settings of the type and the subtype.

(2) Duration.

(3) Receiver address (RA).

(4) Transmitter address (TA).

(5) SSW: The SSW includes a direction field, a count down (CDOWN) field, a sector identifier (sector ID) field, a DMG antenna identifier (DMG antenna ID) field, and an RXSS length (RXSS length) field, and the like.

The direction field indicates whether a transmission direction of the NEW SSW frame is an initiator or a responder of beam training. The CDOWN field is a counter used to perform sector sweep by a STA that sends the NEW SSW frame, and is used to indicate a transmission quantity of remaining NEW SSW frames that are before the sector sweep ends. The sector identifier field indicates a sector number for transmitting the current NEW SSW frame. The DMG antenna identifier field indicates an antenna used for current transmission. The RXSS length field indicates a length of receive sector sweep.

(6) SSW feedback information (SSW FBCK): The information includes a sector selection result fed back by using the NEW SSW frame for a beacon frame sent by an AP.

(7) Frame check sequence (FCS): The frame check sequence is used by a network adapter or an interface for a received frame, to determine whether an error occurs.

The new SSW frame may further include a quantity of antennas (quantity of antennas) and information about each antenna (per antenna info). The C-AP cannot directly communicate with all the STAs, and the M-AP instead of the C-AP performs polling. Therefore, if the STA is not notified, in a previous VCSP phase, of a specific quantity of beacon frames that the STA can receive from M-APs, the quantity of antennas field identifies a quantity of destination APs to which the new SSW frame is to be sent. If the STA has been notified, in a previous VSCP phase, of a quantity of beacon frames that the STA can receive from APs, the quantity of antennas field may not appear. The new SSW frame may further include the quantity of antennas and specific information of each antenna. The specific information of each antenna may include an antenna index, sector selection, and a signal-to-noise ratio (SNR) report, and is sent by the STA to the M-AP.

In a design, information about each antenna may include a sector selection field corresponding to each antenna (namely, each AP), an antenna identifier (for example, an AP identifier) field, and an SNR report field. The sector selection field may be a sector identifier and/or a beam (beam) identifier. In another design, information about each antenna may include a count down (CDOWN) field corresponding to each antenna (namely, each AP), an antenna identifier (for example, an AP identifier) field, and an SNR report field. The CDOWN field may be a CDOWN value corresponding to a sector and/or a beam that are/is selected by the STA, and the AP may determine, based on the CDOWN value, the sector and/or the beam that are/is selected by the STA.

It should be understood that the CDOWN field is a counter, may be included in an SSW frame sent by the AP to the STA in the I-TXSS phase, and is used to indicate a transmission quantity of remaining SSW frames that are before TXSS or RXSS ends. The SSW frame further includes a sector identifier and/or a beam identifier. Therefore, the CDOWN value may be used to determine the sector identifier and/or the beam identifier that correspond/corresponds to the SSW frame for sending the CDOWN value. Optionally, a value of the field may range from 0 to 511, is sequentially decreased by 1 based on a sending sequence of SSW frames, and is 0 in the last SSW frame.

For example, if the quantity of antennas is 2, that is, the quantity of APs is 2, assuming that the two APs are respectively an AP 1 and an AP 2, information about each antenna may include an identifier of the AP 1, a sector selection result and an SNR report that correspond to the AP 1, an identifier of the AP 2, and a sector selection result and an SNR report that correspond to the AP 2. The sector selection result may be directly indicated by using the sector identifier and/or the beam identifier, or may be indicated by using the CDOWN value. This is not limited in this embodiment of this application.

Figure 8:
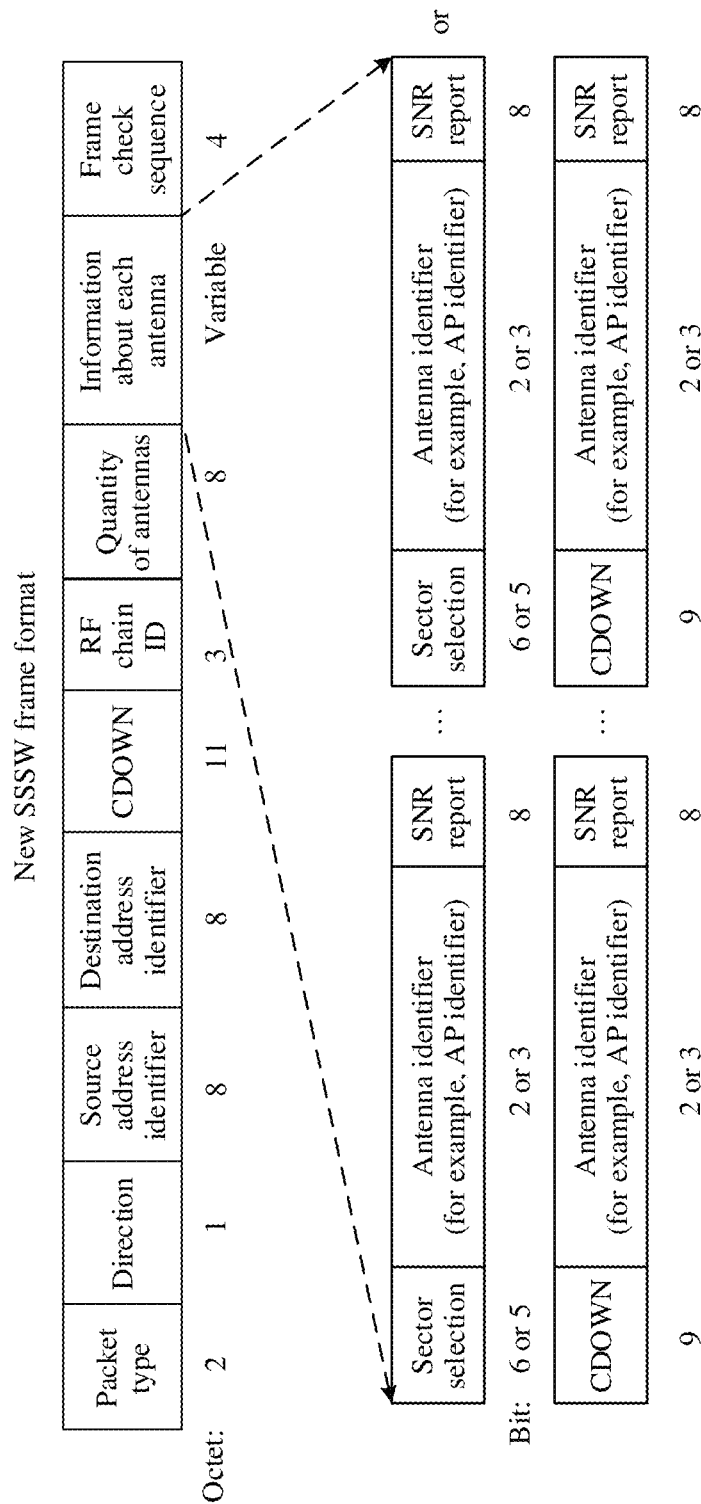
FIG. 8 is a schematic structural diagram of a new short sector sweep frame (new SSSW frame) according to an embodiment of this application.

In another possible implementation, the new SSW frame may alternatively be a new SSSW frame. Similar to the new SSW frame, the new SSSW frame may also include a sector selection result obtained by the STA by measuring the beacon frame sent by the AP. Therefore, the new SSSW frame may include a quantity of antennas (quantity of antennas), fed back by the STA and information (per antenna info) corresponding to each antenna. The information corresponding to each antenna may include a sector selection (sector select) result and a corresponding antenna index. Optionally, a frame format of the NEW SSSW frame is shown in FIG. 8.

The new SSSW frame includes the following fields:

(1) Packet type: The packet type indicates a type of a packet, and when this field is 0, it indicates that a frame sent by using the data packet is an SSSW frame.

(2) Direction: The direction indicates whether a transmission direction of the new SSSW frame is an initiator or a responder of beam training.

(3) Duration: The duration indicates duration of the packet.

(4) Source address identifier (source AID): The source address identifier indicates an address identifier (address ID, AID) of a transmitter.

(5) Destination address identifier (destination AID): The destination address identifier indicates an AID of a receiver.

(6) CDOWN: The CDOWN is a counter used to perform sector sweep by a STA that sends the new SSSW frame, and is used to indicate a transmission quantity of remaining NEW SSSW frames that are before the sector sweep ends.

(7) RF chain ID: The RF chain ID indicates a radio frequency chain used for current transmission.

(8) Quantity of antennas (quantity of antennas): similar to the NEW SSW frame.

(9) Information about each antenna (per antenna info): similar to the NEW SSW frame.

(10) Frame check sequence (FCS): The frame check sequence is used by a network adapter or an interface that receives a frame, to determine whether an error occurs.

Content and a structure of the new SSSW frame are similar to those of the foregoing new SSW frame, and details are not described herein again.

Because the new SSW frame or the new SSSW frame includes an initiator sector sweep result obtained by the STA by measuring the beacon frame sent by the AP, for a specific STA, the STA can receive beacon frames sent by P APs in the n+1 APs in the BPAC, where p is a positive integer less than or equal to n+1. The foregoing design includes two different mechanisms. One mechanism is that the STA selects a sector for each of the P APs, and the sector may be an optimal (for example, optimal signal quality or a strongest signal strength) sector corresponding to each AP. The other mechanism is that the STA selects a sector for each of Q APs in the P APs, where Q is a positive integer less than P. In other words, the STA selects Q sectors in total, and the Q sectors may be Q optimal sectors of all the APs. Optionally, in the new SSW frame or the new SSSW frame, the STA may sort the Q APs. Because values of P and Q are variable, a length of an SSW FBCK field in the NEW SSW frame or a length of an information field of each antenna in the new SSSW frame is variable.

It should be understood that Q may alternatively be predefined. In this way, the length of the SSW FBCK field in the new SSW frame or the length of the information field of each antenna in the new SSSW frame may be fixed, and the quantity of antennas field may not be required.

In the SSW feedback phase, each M-AP arranges and summarizes a received NEW SSW frame, and sends an AP FBCK frame (namely, the foregoing second information) to the C-AP to implement feedback. Therefore, the C-AP can collect sector selection results of all M-APs and STAs associated with the M-APs.

Specifically, the AP FBCK frame may include an identifier of a STA, an identifier of an AP that receives a sector sweep frame of the STA, and a sector selection result obtained by the AP by measuring the sector sweep frame of the STA. Because the AP FBCK frame is fed back by a specific M-AP to the C-AP, the M-AP may summarize collected sector selection results that are sent by a plurality of STAs respectively by using new SSW frames, integrate the sector selection results into one AP FBCK frame, and report the AP FBCK frame to the C-AP.

Figure 9:
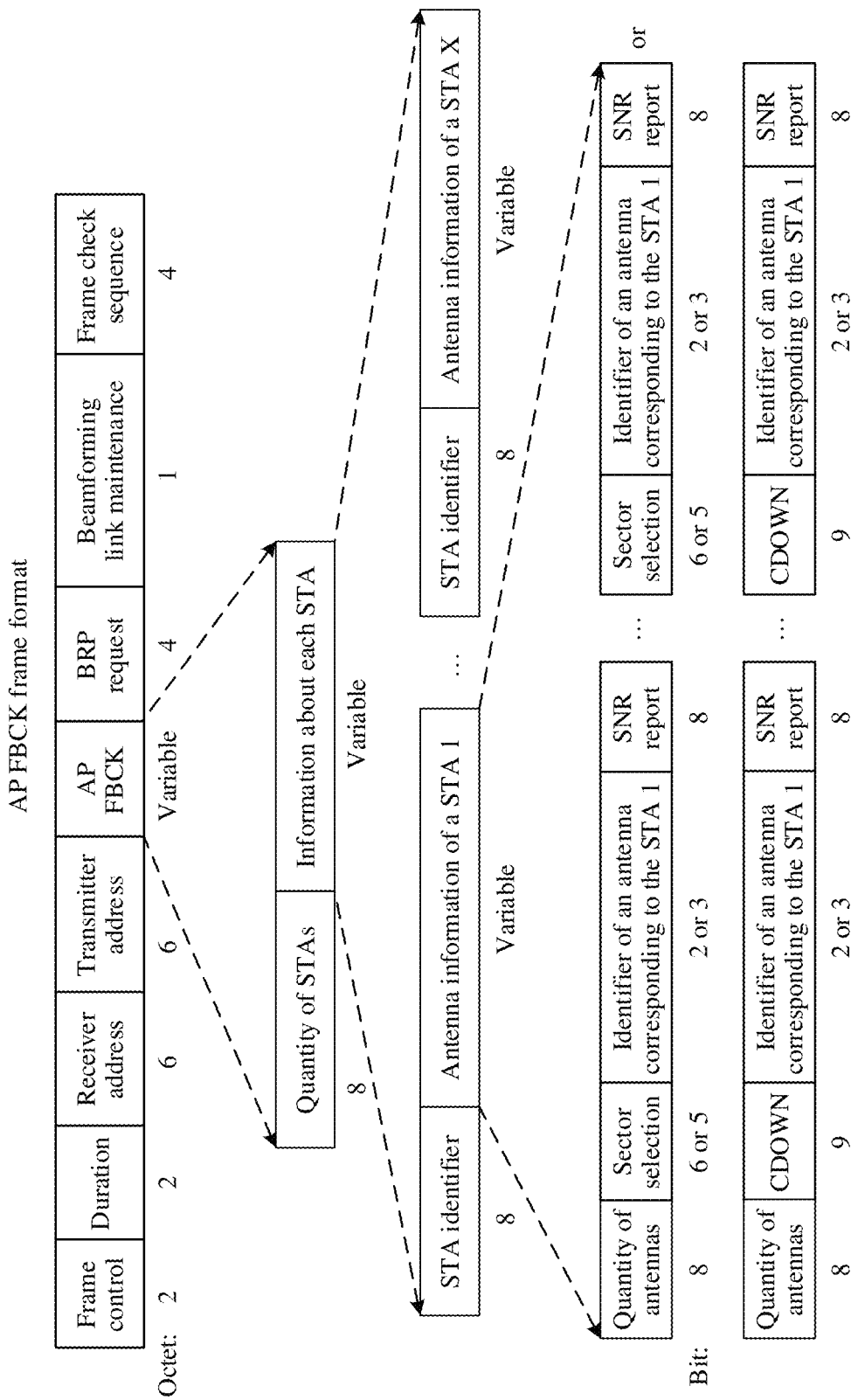
FIG. 9 is a schematic structural diagram of an AP feedback frame (AP FBCK frame) according to an embodiment of this application.

In a possible implementation, a frame format of the AP FBCK frame is shown in FIG. 9. FIG. 9 shows a sector selection result of X STAs, where X is an integer that is greater than or equal to 1 and less than or equal to m, and m is a quantity of STAs participating in association beamforming training in a BPAC. The X STAs are STAs located within coverage of the M-AP, and each STA can receive beacon frames sent by some APs. The STAs perform beam training with these APs, so that these APs measure sector sweep frames sent by the STAs, to obtain a sector selection result. Therefore, in the AP FBCK frame, for each of the X STAs, an identifier (namely, an identifier of an AP that receives a sector sweep frame of the STA) of an AP corresponding to the STA and a corresponding sector selection result (namely, a sector selection result obtained by the AP by measuring the sector sweep frame of the STA) need to be indicated for the STA. For a specific STA, an identifier of an AP corresponding to the STA is an antenna identifier (for example, an AP identifier) field in FIG. 9. A sector selection result of the AP corresponding to the STA is a sector selection field or a CDOWN field adjacent to the antenna identifier field of the AP in FIG. 9. Optionally, the AP FBCK frame may further include an SNR report.

In a design, antenna information of a STA 1 may include a quantity of antennas (namely, a quantity of APs) corresponding to the STA 1, a sector selection field of each antenna (namely, each AP) corresponding to the STA 1, an identifier (for example, an AP identifier) field of an antenna corresponding to the STA 1, and an SNR report field. The sector selection field may be a sector identifier and/or a beam (beam) identifier. In another design, antenna information of a STA 1 may include a quantity of antennas (namely, a quantity of APs) corresponding to the STA 1, a count down (CDOWN) field of each antenna (namely, each AP) corresponding to the STA 1, an identifier (for example, an AP identifier) field of an antenna corresponding to the STA 1, and an SNR report field, where the CDOWN field may be a CDOWN value corresponding to a sector and/or a beam that are/is selected by the STA. The C-AP may determine, based on the CDOWN value, the sector and/or the beam that are/is selected by the STA.

For example, in FIG. 9, for the STA 1, assuming that the M-AP needs to feed back sector selection results of the STA 1 for three APs, an antenna information field of the STA 1 may include a quantity of antennas field, and the quantity of antennas field is used to indicate that a quantity of APs related to the sector selection results of the STA 1 is 3. The antenna information field of the STA 1 may further include three sector selection fields or CDOWN fields, and the three sector selection fields or CDOWN fields are respectively used to indicate the sector selection results of the three APs. To distinguish between the sector selection results of the three APs, the antenna information field may further include three antenna identifier fields corresponding to the STA 1, and the fields may be respectively identifiers of the three APs related to the sector selection results of the STA 1. Specifically, for an AP 1 in the foregoing three APs, a sector selection field or a CDOWN field of the STA 1 for the AP 1 may be adjacent to an identifier field of the AP 1. In this way, a C-AP that receives the AP FBCK frame can accurately obtain a sector selection result between each STA and each AP.

After the C-AP collects AP FBCK frames reported by all APs, the C-AP arranges and summarizes the received AP FBCK frames, generates an A-BFT FBCK forwarding frame, and sends the A-BFT FBCK forwarding frame (namely, the foregoing third information) to at least one M-AP. The A-BFT FBCK forwarding frame includes training information that is of all the APs and STAs and that is collected by the C-AP, including key information such as sector selection, antenna information, and an SNR.

Similar to the foregoing frame format of the AP FBCK frame, a forwarding field is mainly modified in the A-BFT FBCK forwarding frame, and the forwarding field includes information related to antennas of all STAs served by the M-AP and transmit sector selection information. Details are not described herein.

Figure 10:
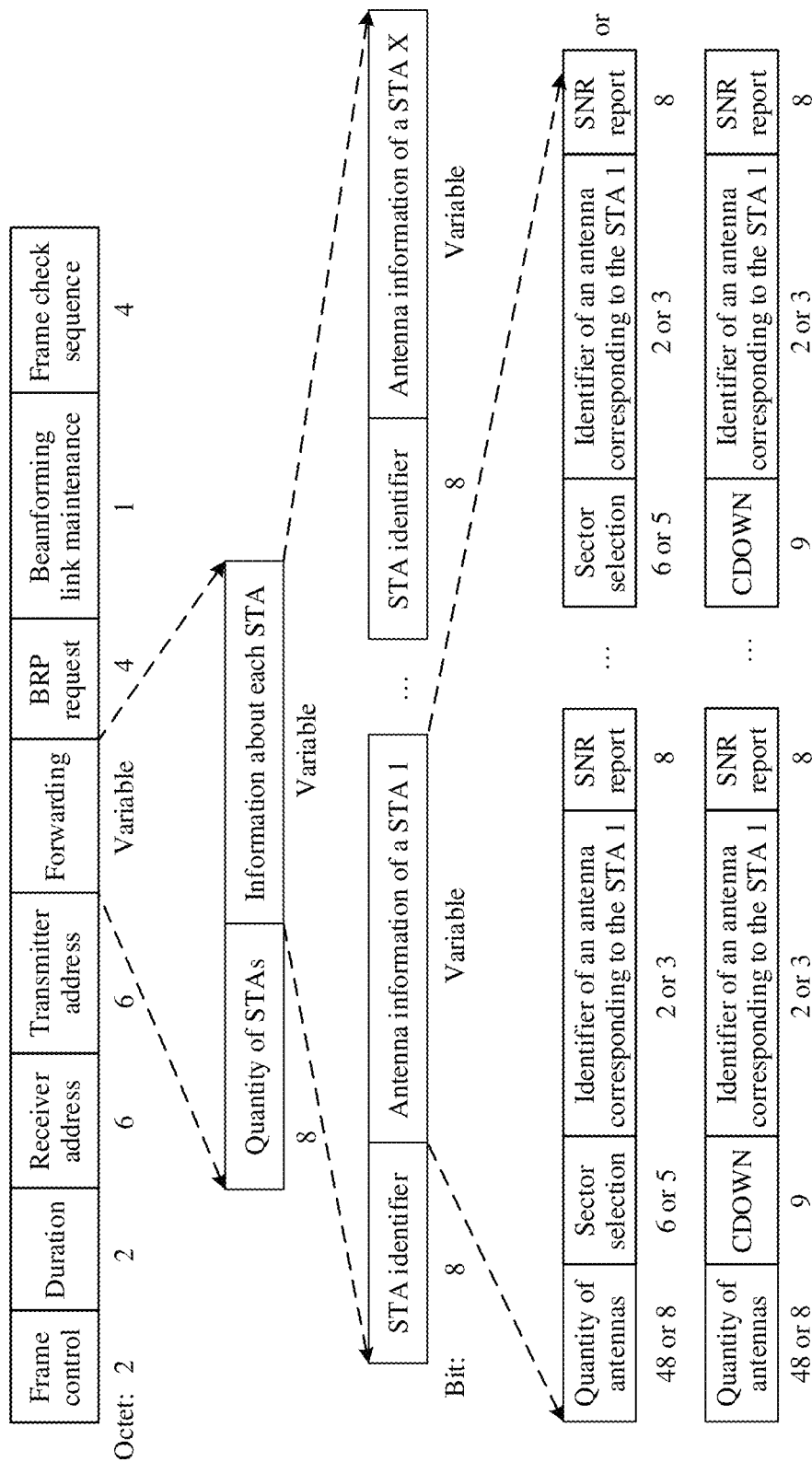
FIG. 10 is a schematic structural diagram of an A-BFT feedback forwarding frame (A-BFT FBCK forwarding frame) or a new sector sweep feedback frame (new SSW FBCK frame) according to an embodiment of this application.

In a possible implementation, a frame format of the A-BFT FBCK forwarding frame or a new SSW FBCK frame is shown in FIG. 10. The frame format shown in FIG. 10 includes a quantity of STAs and information about each STA. The information about each STA further includes a STA identifier and antenna information of each STA. The antenna information of each STA may include a quantity (namely, a quantity of APs receiving a sector sweep frame of the STA) of APs corresponding to the STA, an identifier (namely, an identifier of an AP receiving the sector sweep frame of the STA) of an AP corresponding to the STA, and a corresponding sector selection result (namely, a sector selection result obtained by the AP by measuring the sector sweep frame of the STA).

Figure 11:
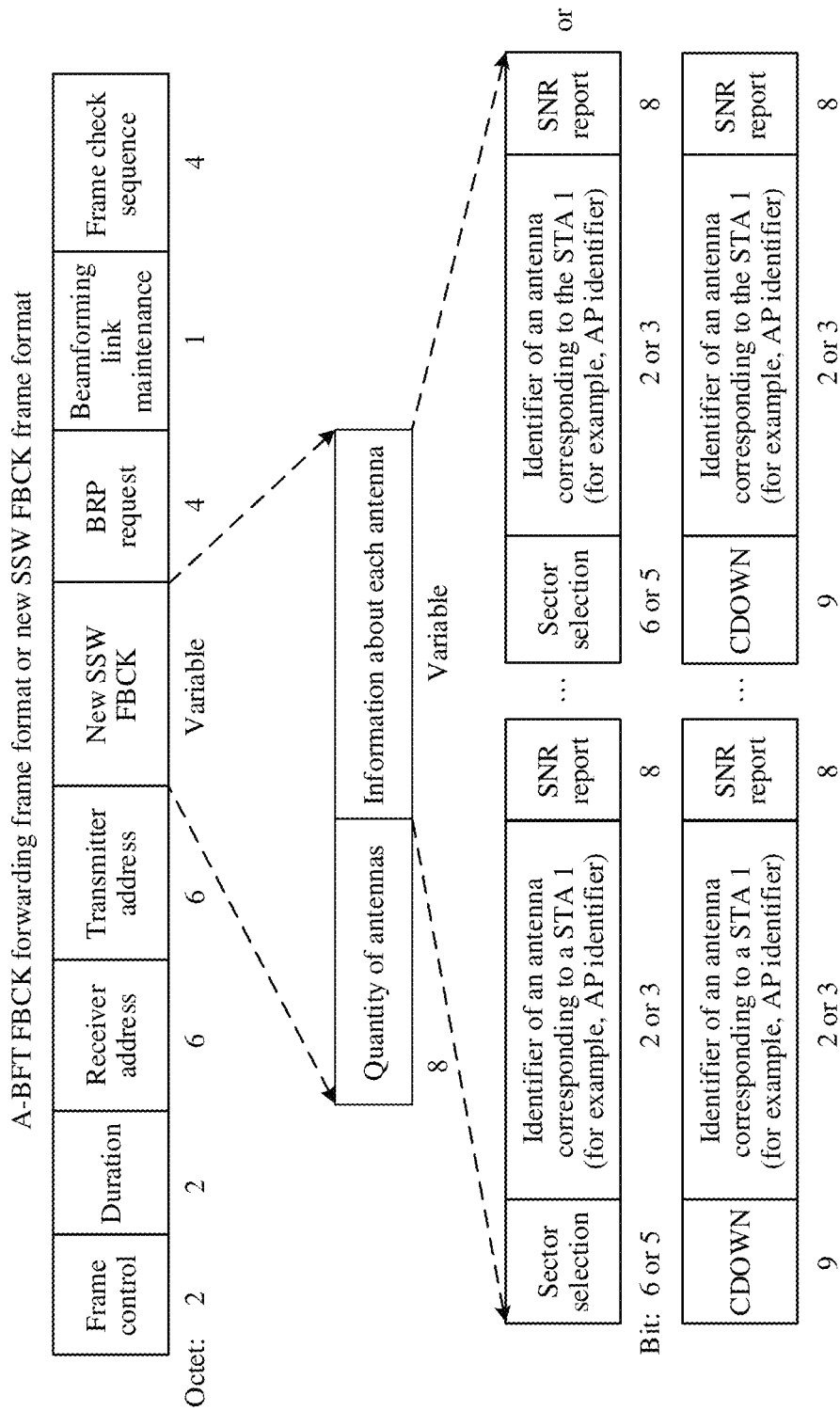
FIG. 11 is another schematic structural diagram of an A-BFT feedback forwarding frame (A-BFT FBCK forwarding frame) or a new sector sweep feedback frame (new SSW FBCK frame) according to an embodiment of this application.

In another possible implementation, a frame format of the A-BFT FBCK forwarding frame or a new SSW FBCK frame is shown in FIG. 11. The frame structure shown in FIG. 11 is directed at a specific STA, for example, a STA 1. Therefore, the frame structure includes fields of a quantity of antennas and information about each antenna. The quantity of antennas is used to indicate a quantity (namely, a quantity of APs receiving a sector sweep frame of the STA 1) of APs corresponding to the STA 1. The information about each antenna includes an identifier (namely, an identifier of an AP receiving the sector sweep frame of the STA 1) of an AP corresponding to the STA 1, and a corresponding sector selection result (namely, a sector selection result obtained by the AP by measuring the sector sweep frame of the STA 1).

In this embodiment of this application, the C-AP may send the A-BFT FBCK forwarding frame shown in FIG. 10 to at least one M-AP, and the at least one M-AP may directly forward the A-BFT FBCK forwarding frame as a new SSW FBCK frame to a STA within coverage of the at least one M-AP. Alternatively, the C-AP may filter sector selection results to obtain a new SSW FBCK frame (as shown in FIG. 11) for the STA 1, and send the new SSW FBCK frame to the STA 1. A new SSW FBCK frame of another STA is processed in a same manner.

In this embodiment of this application, the C-AP may alternatively perform design for each STA, and send the A-BFT FBCK forwarding frame shown in FIG. 11 to at least one M-AP, and the at least one M-AP may directly forward the A-BFT FBCK forwarding frame as a new SSW FBCK frame. For example, an M-AP covering the STA 1 sends a new SSW FBCK frame of the STA 1 to the STA 1.

It should be understood that the A-BFT FBCK forwarding frame is sent by the C-AP to the at least one M-AP, and the at least one M-AP may be one M-AP in the n M-APs shown in FIG. 2, or may be a plurality of M-APs in the n M-APs shown in FIG. 2. This is not limited in this embodiment of this application. The M-AP may also be referred to as a serving AP (serving AP), and the C-AP may select one or more M-APs from the n M-APs in advance as a serving AP according to a method.

The serving AP can cover all the STAs. The serving AP receives the A-BFT FBCK forwarding frame from the C-AP, and the frame includes all feedback information of the M-AP for the STA. Then, the serving AP may send a new SSW FBCK frame to the STA. In a possible implementation, the NEW SSW FBCK frame may be shown in FIG. 11, and details are not described herein again.

Specifically, in this embodiment of this application, a proper serving AP may be selected in a plurality of manners. This is not limited in this embodiment of this application.

Manner 1: A STA makes a selection.

The STA further indicates an optimal M-AP in a new SSW frame or a new SSSW frame, so that a C-AP determines a serving AP based on the indication of the STA. Optionally, the STA may perform indication by using a field in a sector sweep frame, or may sequentially arrange AP information that is fed back, and determine the serving AP according to an agreed rule. For example, an AP corresponding to the first piece of AP information is the serving AP.

Manner 2: All APs select a serving AP through negotiation.

Manner 3: A STA provides a suggestion, and then an AP selects a proper serving AP based on the suggestion of the STA and a result of negotiation between the STA and the AP.

It should be further understood that there may further be another possibility in the foregoing beam training process. For example, after a sector sweep phase, the STA may send a plurality of SSW frames to an M-AP, and the M-AP may send a plurality of AP FBCK frames to a C-AP. A new SSW FBCK frame may be sent in the A-BFT phase shown in FIG. 1, or may be sent in an ATI or a DTI, or a polling mechanism may be introduced in the training process to avoid a collision, or the like. This is not limited in this embodiment of this application.

Figure 12:
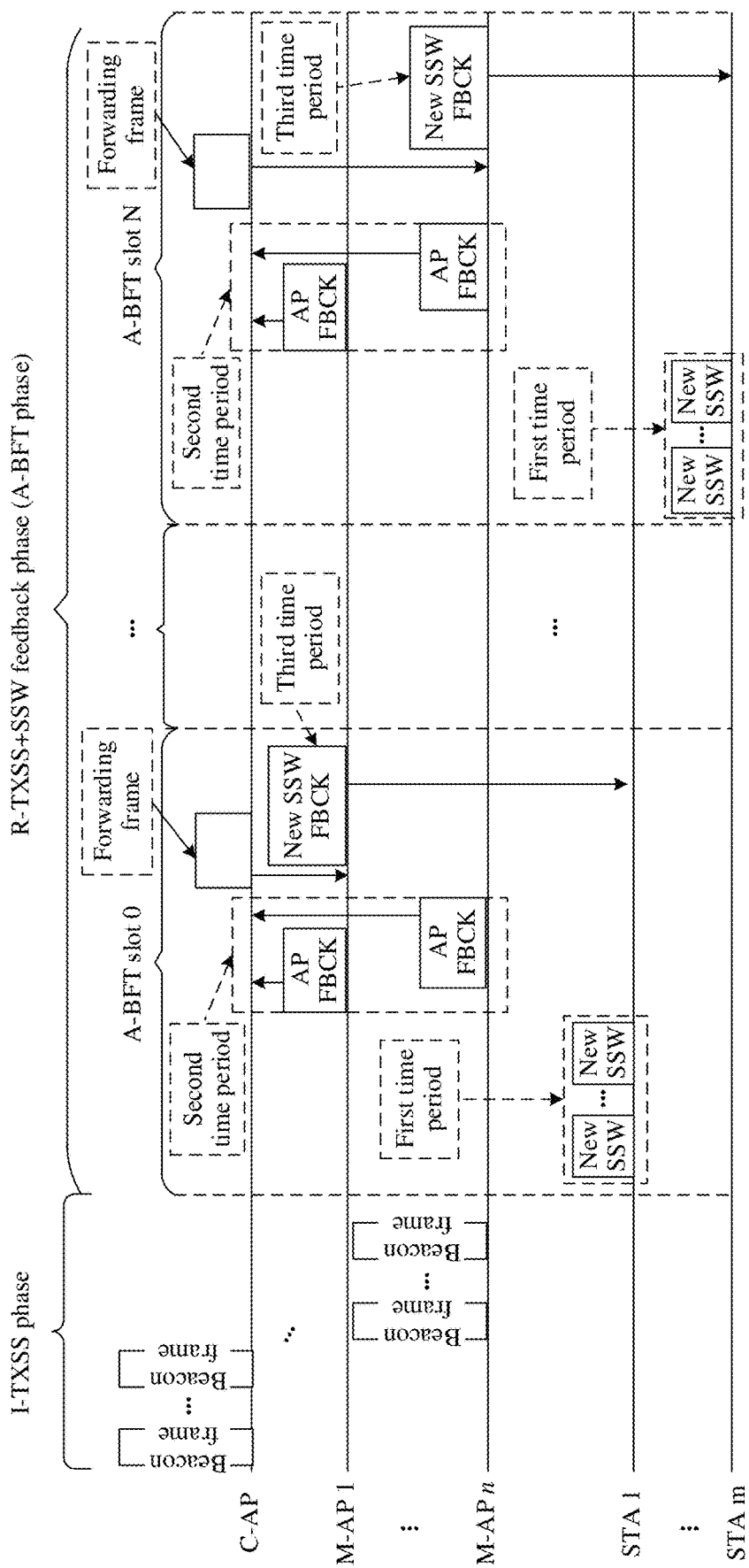
FIG. 12 is another schematic flowchart of BPAC-based A-BFT according to an embodiment of this application.

FIG. 12 is another schematic flowchart of A-BFT in which a C-AP cannot directly communicate with all STAs. In FIG. 12, after a STA sends a new SSW frame to an M-AP, the M-AP may immediately send an AP FBCK frame to a C-AP to perform training feedback, to be specific, a second time period in which the M-AP sends the AP FBCK frame is in an A-BFT time period. A third time period in which the C-AP sends an A-BFT FBCK forwarding frame to at least one M-AP and the at least one M-AP sends a new SSW FBCK frame to the STA may also be located within the A-BFT time period. Specifically, for a STA 1, the STA 1 selects an A-BFT slot 0 for access, and sends a new SSW frame. In this case, an M-AP 1, an M-AP 2, . . . , and an M-AP n each send an AP FBCK frame to the C-AP in the A-BFT slot 0. The C-AP summarizes first sector selection results corresponding to the STA 1, and sends an A-BFT FBCK forwarding frame to the at least one M-AP in the A-BFT slot 0. The at least one M-AP may send a new SSW FBCK frame to a STA within coverage of each of the at least one M-AP as a feedback of an entire training result.

However, in the beam training process shown in FIG. 6, after all the STAs complete sending of the new SSW frame, the M-AP sends the AP FBCK frame to the C-AP, to report a training result of the M-AP. Then, the C-AP sends the A-BFT FBCK forwarding frame to the at least one M-AP, and the at least one M-AP then sends the new SSW FBCK frame to the STA as a feedback of an entire training result.

In an immediate feedback manner, the C-AP may relatively quickly obtain information fed back by the M-AP, to first integrate the obtained information. However, in a centralized feedback manner, the M-AP may arrange information obtained by measuring sector sweep frames sent by a plurality of STAs, and summarize the information in one AP FBCK frame for sending, thereby reducing signaling overheads, and making a training process more simple and efficient.

In this embodiment of this application, an AP cluster includes a plurality of APs, and the C-AP in the AP cluster collects feedback information of all the M-APs in a unified manner, and then sends the feedback information to each STA in a unified manner. By using a global coordination advantage of the C-AP, a time at which the M-AP and the STA perform association beamforming training is controlled in a unified manner. In addition, in a feedback process, specific information of an antenna is added to a conventional feedback frame, so that the M-AP can report more complete training information during feedback, thereby making an entire training process more efficient. In addition, when the C-AP cannot directly communicate with all the STAs, by using a method in which the C-AP contacts the M-AP for forwarding, the M-AP performs training with the STA associated with the M-AP, thereby ensuring training stability.

Case 2: A C-AP can directly communicate with all STAs.

Figure 13:
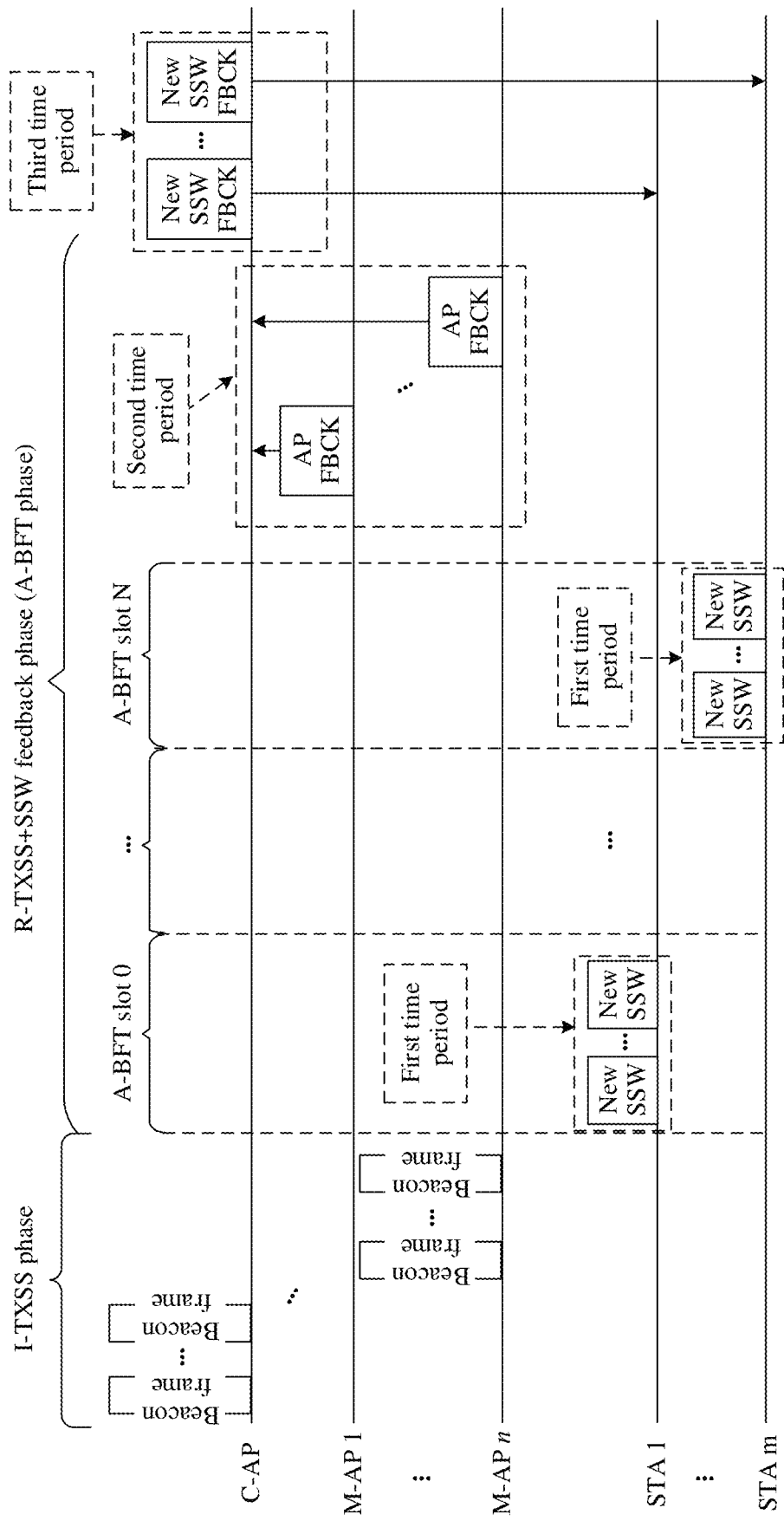
FIG. 13 is another schematic flowchart of BPAC-based A-BFT according to an embodiment of this application.

FIG. 13 is a schematic flowchart of A-BFT in which a C-AP can directly communicate with all STAs. In FIG. 13, because all the STAs can directly communicate with the C-AP, after obtaining AP FBCK frames sent by all M-APs, the C-AP may directly send a new SSW FBCK frame to each STA as a feedback of an entire training result, and there is no need to select a serving AP and forward a sector selection result by the serving AP. Because a process in FIG. 13 is similar to that in FIG. 6, a frame sent in a training process is similar to that in FIG. 6. Details are not described herein again.

In the beam training process shown in FIG. 13, after all the STAs complete sending of a new SSW frame, an M-AP sends an AP FBCK frame to the C-AP, to report a training result of the M-AP, and the C-AP sends the new SSW FBCK frame to each STA as the feedback of the entire training result.

Figure 14:
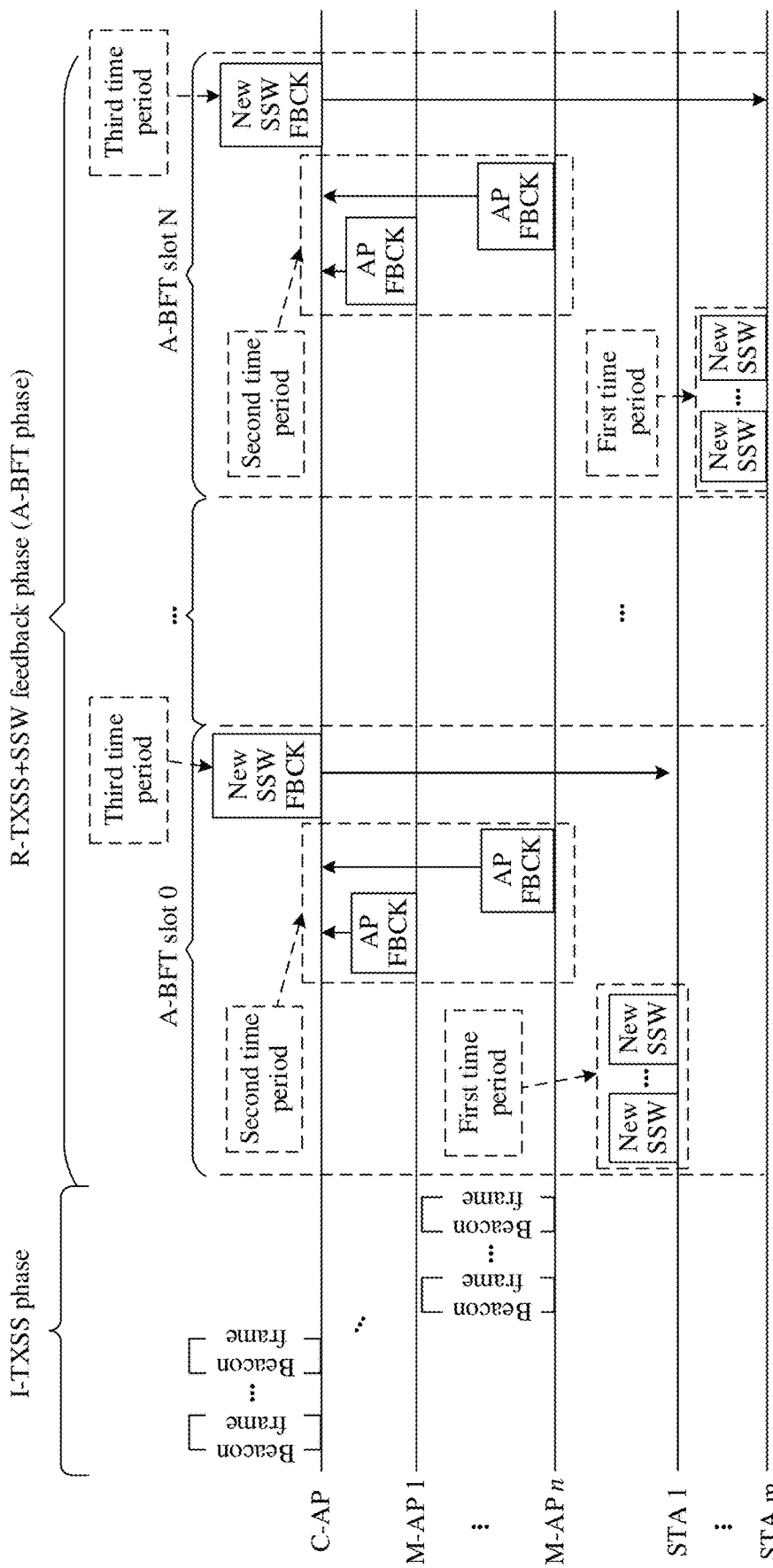
FIG. 14 is another schematic flowchart of BPAC-based A-BFT according to an embodiment of this application.

FIG. 14 is another schematic flowchart of A-BFT in which a C-AP can directly communicate with all STAs. In FIG. 14, after a STA sends a new SSW frame to an M-AP, the M-AP may immediately send an AP FBCK frame to a C-AP to perform training feedback, to be specific, a second time period in which the M-AP sends the AP FBCK frame is located within an A-BFT time period. A third time period in which the C-AP sends a new SSW FBCK frame to the STA may also be located within the A-BFT time period. Because a process in FIG. 14 is similar to that in FIG. 12, a frame sent in a training process is similar to that in FIG. 12. Details are not described herein again.

In an immediate feedback manner, the C-AP may relatively quickly obtain information fed back by the M-AP, to first integrate the obtained information. However, in a centralized feedback manner, the M-AP may arrange information obtained by measuring sector sweep frames sent by a plurality of STAs, and summarize the information in one AP FBCK frame for sending, thereby reducing signaling overheads, and making a training process more simple and efficient.

In this embodiment of this application, all APs within a range are combined and considered as one AP cluster, and are distinguished internally by using the C-AP and the M-AP. Because the C-AP can directly communicate with all the STAs, the C-AP performs global control in an entire SLS phase, and the beam training process is simplified. This helps improve beam training efficiency in a multi-AP and multi-STA scenario.

Figure 15:
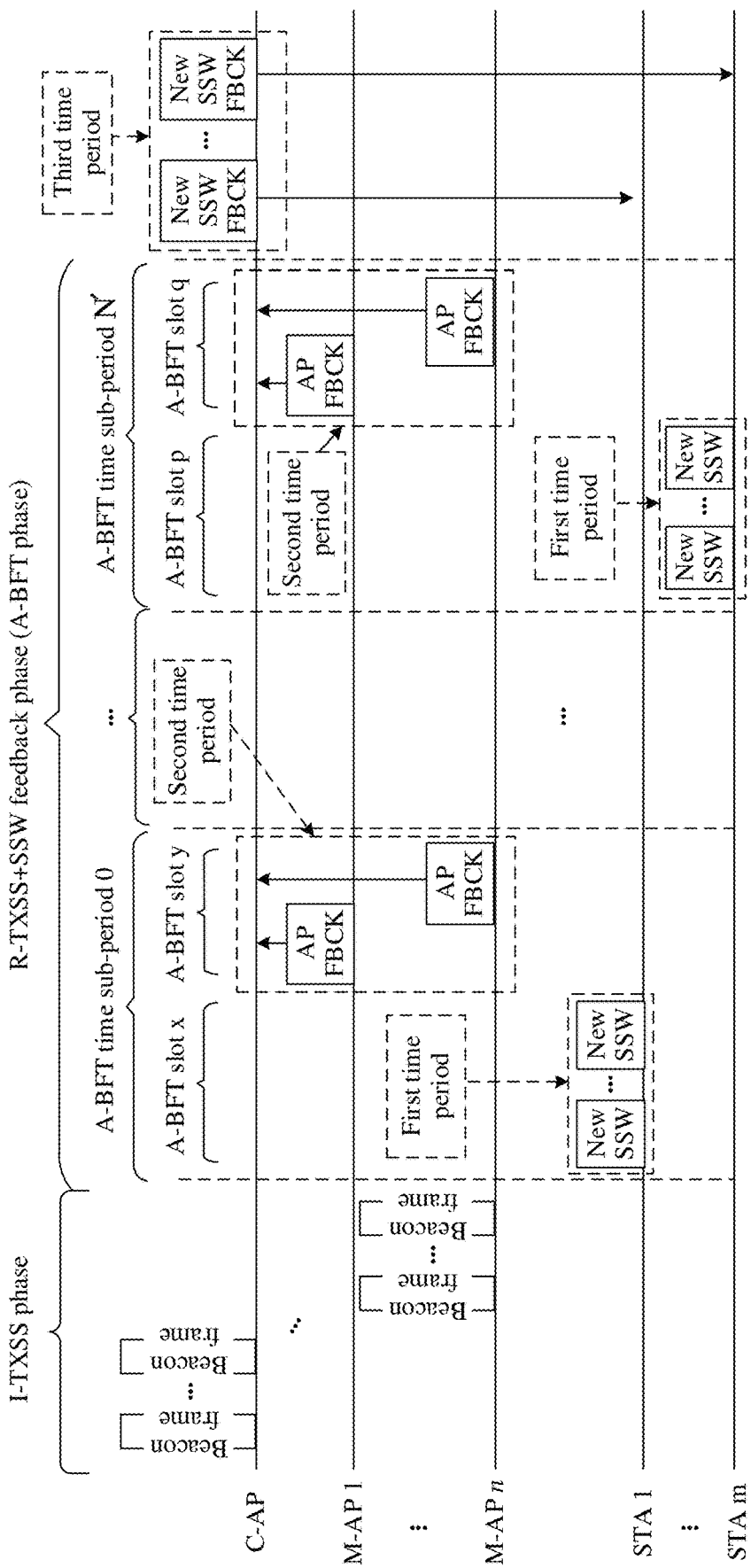
FIG. 15 is another schematic flowchart of BPAC-based A-BFT according to an embodiment of this application.

FIG. 15 is another schematic flowchart of A-BFT in which a C-AP cannot directly communicate with all STAs. In FIG. 15, an A-BFT time period includes a plurality of A-BFT time sub-periods, which are respectively an A-BFT time sub-period 0 to an A-BFT time sub-period N', where N' is a positive integer less than a quantity N of A-BFT slots, each A-BFT time sub-period includes one or more A-BFT slots, and quantities of A-BFT slots included in each A-BFT time sub-period may be equal or may not be equal. This is not limited in this embodiment of this application. In each A-BFT time sub-period, a part of A-BFT slots in the front may be used by a STA to send a sector sweep frame, and a part of A-BFT slots in the back may be used by an M-AP to send an AP FBCK frame. It should be noted that, in a specific A-BFT time sub-period, a STA sending a new SSW frame is a STA within coverage of an AP corresponding to the A-BFT time sub-period.

As shown in FIG. 15, in the A-BFT time sub-period 0, a STA 1 selects an A-BFT slot x to send a new SSW frame, an M-AP that receives the new SSW frame of the STA 1 may choose to send a respective AP FBCK frame to the C-AP in an A-BFT slot y after the A-BFT slot x.

FIG. 15 shows a case in which the M-AP separately feeds back an AP FBCK frame in each A-BFT time sub-period.

However, it should be understood that the M-AP may alternatively feed back an AP FBCK frame to the C-AP after all the A-BFT time sub-periods, to reduce signaling overheads and simplify a training process. This is not limited in this embodiment of this application. For a new SSW FBCK frame, when the M-AP separately feeds back the AP FBCK frame in each A-BFT time sub-period, the C-AP may separately send a new SSW FBCK frame to the STA in each A-BFT time sub-period, or may send a new SSW FBCK frame to the STA in a unified manner after all the A-BFT time sub-periods. This is not limited in this embodiment of this application.

It should be further understood that, in the procedure shown in FIG. 15, the C-AP can directly communicate with all the STAs. If the C-AP cannot directly communicate with all the STAs, the C-AP needs to send an A-BFT FBCK forwarding frame to at least one M-AP, and then, the at least one M-AP sends a new SSW FBCK frame to the STA. A principle is similar to that in the foregoing embodiments, and therefore is not listed one by one herein.

It should be noted that, if the C-AP and each M-AP have been trained previously, in this case, the C-AP and the M-AP have learned of optimal transmit sectors and optimal receive sectors of all APs in a process of mutual communication between the C-AP and the M-AP. Therefore, in a feedback phase, a simplified manner may be used, to be specific, that all M-APs sequentially perform feedback is changed to that all the M-APs concurrently send AP FBCK frames. Because the beam training has been performed previously, it can be ensured that no interference is generated in this case. Similarly, when sending A-BFT FBCK forwarding frames, the C-AP may also concurrently send the BF FBCK forwarding frames instead of sequentially sending the BF FBCK forwarding frames, thereby improving training efficiency.

Figure 16:
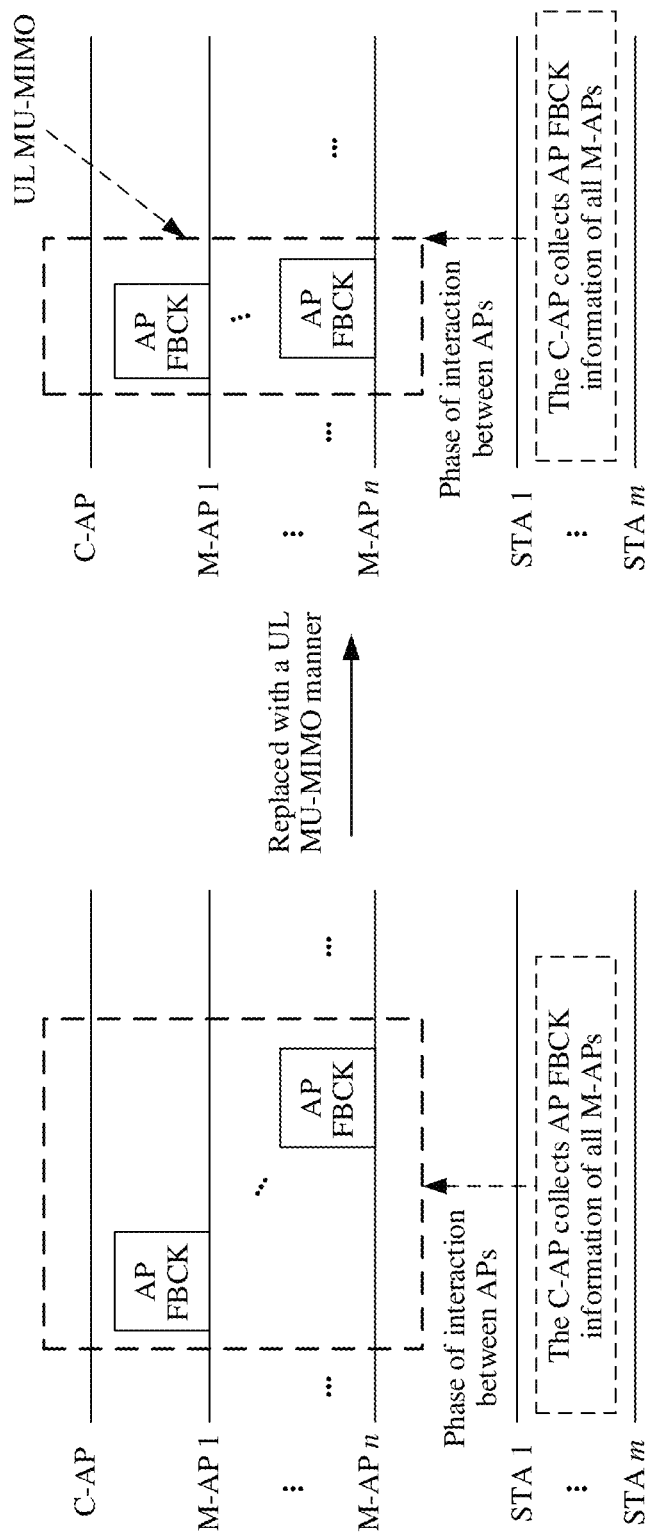
FIG. 16 is a schematic flowchart of sending an AP feedback frame (AP FBCK frame) in a beam training process according to an embodiment of this application.

FIG. 16 is a schematic flowchart of feeding back an AP FBCK frame in beam training according to an embodiment of this application. As shown in FIG. 16, a feedback manner on the left is to perform feedback one by one, to be specific, various M-APs send AP FBCK frames to a C-AP in different time periods. A feedback manner on the right is to perform concurrent feedback, and various M-APs concurrently send respective AP FBCK frames to a C-AP. This is not limited in this embodiment of this application.

Figure 17:
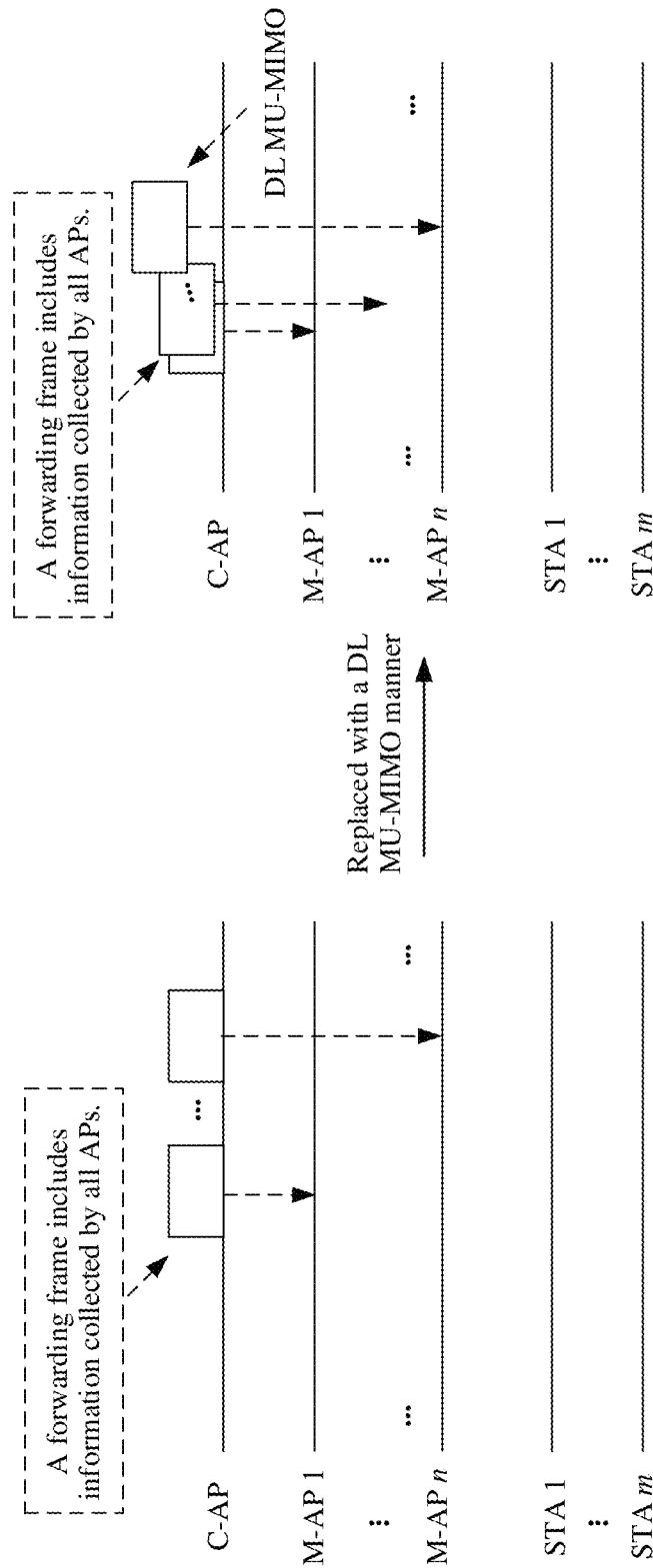
FIG. 17 is a schematic flowchart of sending a forwarding frame (forwarding frame) in a beam training process according to an embodiment of this application.

FIG. 17 is a schematic flowchart of sending an A-BFT FBCK forwarding frame in beam training according to an embodiment of this application. As shown in FIG. 17, a feedback manner on the left is to perform feedback one by one, to be specific, a C-AP sends A-BFT FBCK forwarding frames to various M-APs in different time periods. A feedback manner on the right is to simultaneously perform feedback, and a C-AP simultaneously sends A-BFT FBCK forwarding frames to various M-APs. This is not limited in this embodiment of this application.

It should be understood that, sequence numbers of the foregoing processes do not mean execution sequences. The execution sequences of the processes should be determined based on functions and internal logic of the processes, and should not be construed as any limitation on the implementation processes of the embodiments of the present application.

The foregoing describes in detail the beam training method according to the embodiments of this application with reference to FIG. 1 to FIG. 17. The following describes in detail beam training an apparatus according to the embodiments of this application with reference to FIG. 18 and FIG. 19.

Figure 18:
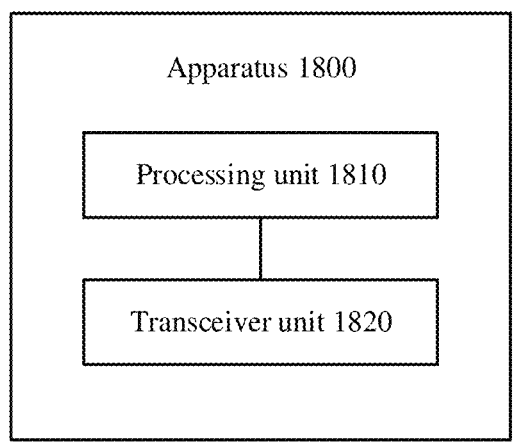
FIG. 18 is a schematic block diagram of an apparatus according to an embodiment of this application.

FIG. 18 shows a beam training apparatus 1800 according to an embodiment of this application. The apparatus 1800 may be the AP in the foregoing embodiment, or may be a chip in the AP, or may be the STA in the foregoing embodiment, or may be a chip in the STA. The apparatus 1800 includes a processing unit 1810 and a transceiver unit 1820.

In a possible design, the apparatus 1800 is configured to implement each procedure and each step corresponding to the first AP in the foregoing method embodiments.

The processing unit 1810 is configured to determine first information. The first information is used to indicate an association beamforming training A-BFT time period, the A-BFT time period is used to perform A-BFT between a plurality of APs and a station STA within coverage of the plurality of APs, and the plurality of APs include the apparatus and at least one second AP. The transceiver unit is configured to send the first information.

Optionally, the A-BFT time period is used by any STA within the coverage of the plurality of APs to perform sector sweep; or the A-BFT time period includes a plurality of A-BFT time sub-periods, each of the plurality of A-BFT time sub-periods corresponds to at least one of the plurality of APs, and each A-BFT time sub-period is used by a STA within coverage of an AP corresponding to each A-BFT time sub-period to perform sector sweep.

Optionally, the first information is further used to indicate a first time period occupied by the STA to perform the sector sweep; and after sending the first information, the transceiver unit 1820 is further configured to receive a sector sweep frame that is sent by a STA within coverage of the apparatus in the first time period.

Optionally, the first information is further used to indicate a second time period occupied by the at least one second AP to send second information; and the transceiver unit 1820 is further configured to receive the second information that is sent by the at least one second AP in the second time period. The second information is used to indicate a first sector selection result, and the first sector selection result is obtained by performing sector sweep in the first time period.

Optionally, the first information is further used to indicate a third time period occupied by the apparatus and/or the at least one second AP to send third information; and the transceiver unit 1820 is further configured to: send the third information to the at least one second AP in the third time period based on the second information, so that the at least one second AP sends the third information to the STA; or send the third information to the STA in the third time period. The third information is used to indicate a second sector selection result of the at least one second AP, and the second sector selection result includes all or a part of the first sector selection result of the at least one second AP.

Optionally, the transceiver unit 1820 is specifically configured to: broadcast a beacon frame that carries the first information; and/or send the first information to the at least one second AP, so that the at least one second AP broadcasts a beacon frame that carries the first information.

In another possible design, the apparatus 1800 is configured to implement each procedure and each step corresponding to the first STA in the foregoing method embodiments.

The transceiver unit 1820 is configured to receive first information. The first information is used to indicate an association beamforming training A-BFT time period, the A-BFT time period is used to perform A-BFT between a plurality of APs and a station STA within coverage of the plurality of APs, the plurality of APs include a first AP and at least one second AP, and the STA includes the apparatus.

The processing unit 1810 is configured to determine, based on the first information, a time period for performing sector sweep.

Optionally, the A-BFT time period is used by any STA within the coverage of the plurality of APs to perform sector sweep; and the processing unit 1810 is specifically configured to determine, based on the first information, the A-BFT time period as the time period that may be used by the apparatus to perform the sector sweep.

Optionally, the A-BFT time period includes a plurality of A-BFT time sub-periods, each of the plurality of A-BFT time sub-periods corresponds to at least one of the plurality of APs, and each A-BFT time sub-period is used by a STA within coverage of an AP corresponding to each A-BFT time sub-period to perform sector sweep; and the processing unit 1810 is specifically configured to determine, based on the first information as the time period that may be used by the apparatus to perform the sector sweep, an A-BFT time sub-period that is in the A-BFT time period and that corresponds to an AP covering the apparatus.

Optionally, the first information is further used to indicate a first time period occupied by the apparatus to perform the sector sweep; and the transceiver unit 1820 is further configured to: after the time period for performing the sector sweep is determined based on the first information, send a sector sweep frame in the first time period.

Optionally, the first information is further used to indicate a second time period occupied by the at least one second AP to send second information, the second information is used to indicate a first sector selection result, and the first sector selection result is obtained by performing sector sweep in the first time period.

Optionally, the first information is further used to indicate a third time period occupied by the first AP and/or the at least one second AP to send third information; and the transceiver unit 1820 is further configured to receive the third information that is sent by the first AP or the at least one second AP in the third time period. The third information is used to indicate a second sector selection result of the at least one second AP, and the second sector selection result includes all or a part of the first sector selection result of the at least one second AP.

Optionally, the transceiver unit 1820 is specifically configured to receive a beacon frame that is broadcast by the first AP and/or the at least one second AP and that carries the first information.

For the beam training apparatus in this embodiment of this application, the first AP sends the first information to configure the A-BFT time period in which the association beamforming training is performed between the plurality of APs and the STA, so that the plurality of APs and the STA within the coverage of the plurality of APs perform beam training according to an indication in the A-BFT time period indicated by using the first information, and the plurality of APs and a plurality of STAs can be controlled to perform association beamforming training, thereby improving system performance.

It should be understood that the apparatus 1800 herein is embodied in a form of functional units. The term "unit" herein may be an application-specific integrated circuit (application-specific integrated circuit, ASIC), an electronic circuit, a processor (for example, a shared processor, a dedicated processor, or a group processor) configured to execute one or more software or firmware programs, a memory, a merged logic circuit, and/or another proper component that supports the described function. In an optional example, a person skilled in the art may understand that the apparatus 1800 may be specifically the first AP or the first STA in the foregoing embodiments, and the apparatus 1800 may be configured to perform each procedure and/or each step corresponding to the first AP or the first STA in the foregoing method embodiments. To avoid repetition, details are not described herein again.

The apparatus 1800 in the foregoing solutions has a function of implementing a corresponding step performed by the first AP or the first STA in the foregoing method. The function may be implemented by hardware, or may be implemented by hardware by executing corresponding software. The hardware or the software includes one or more modules corresponding to the foregoing function. For example, a sending unit may be replaced with a transmitter, a receiving unit may be replaced with a receiver, and another unit such as a determining unit may be replaced with a processor, to respectively perform a sending operation, a receiving operation, and a related processing operation in the method embodiments.

In this embodiment of this application, the apparatus in FIG. 18 may alternatively be a chip or a chip system, for example, a system on chip (SoC). Correspondingly, a receiving unit and a sending unit may be a transceiver circuit of the chip. This is not limited herein.

Figure 19:
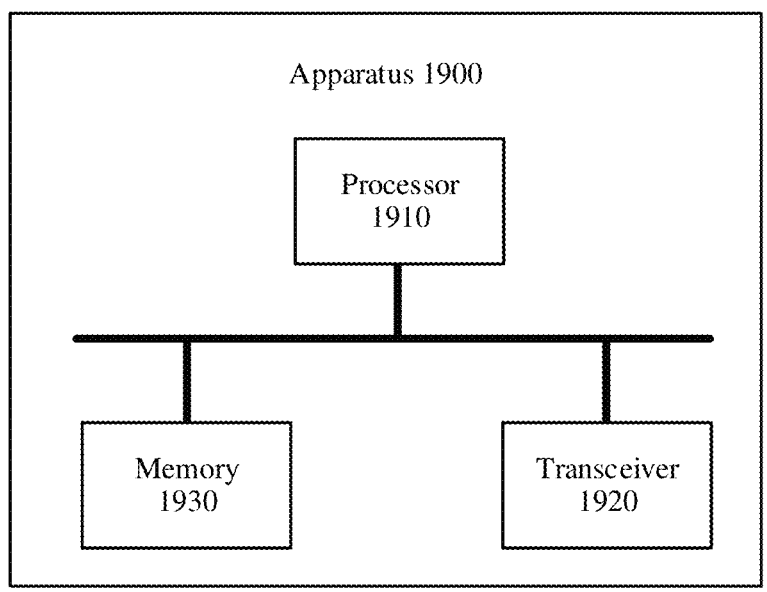
FIG. 19 is a schematic block diagram of another apparatus according to an embodiment of this application.

FIG. 19 shows another beam training apparatus 1900 according to an embodiment of this application. The apparatus 1900 includes a processor 1910, a transceiver 1920, and a memory 1930. The processor 1910, the transceiver 1920, and the memory 1930 communicate with each other through an internal connection path. The memory 1930 is configured to store an instruction. The processor 1910 is configured to execute the instruction stored in the memory 1930, to control the transceiver 1920 to send a signal and/or receive a signal.

In a possible design, the apparatus 1900 is configured to implement each procedure and each step corresponding to the first AP in the foregoing method embodiments.

The processor 1910 is configured to: determine first information, where the first information is used to indicate an association beamforming training A-BFT time period, the A-BFT time period is used to perform A-BFT between a plurality of APs and a station STA within coverage of the plurality of APs, and the plurality of APs include the apparatus and at least one second AP; and send the first information by using the transceiver 1920.

In another possible design, the apparatus 1900 is configured to implement each procedure and each step corresponding to the first STA in the foregoing method embodiments.

The processor 1910 is configured to: receive the first information by using the transceiver 1920, where the first information is used to indicate an association beamforming training A-BFT time period, the A-BFT time period is used to perform A-BFT between a plurality of APs and a station STA within coverage of the plurality of APs, the plurality of APs include a first AP and at least one second AP, and the STA includes the apparatus; and determine, based on the first information, a time period for performing sector sweep.

It should be understood that the apparatus 1900 may be specifically the first AP or the first STA in the foregoing embodiments, and may be configured to perform each step and/or each procedure corresponding to the first AP or the first STA in the foregoing method embodiments. Optionally, the memory 1930 may include a read-only memory and a random access memory, and provide an instruction and data to the processor. A part of the memory may further include a non-volatile random access memory. For example, the memory may further store information of a device type. The processor 1910 may be configured to execute the instruction stored in the memory. In addition, when the processor 1910 executes the instruction stored in the memory, the processor 1910 is configured to perform each step and/or each procedure corresponding to the first AP or the first STA in the foregoing method embodiments.

It should be understood that in this embodiment of this application, the processor in the foregoing apparatus may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

In an implementation process, steps in the foregoing method can be implemented by using a hardware integrated logical circuit in the processor, or by using instructions in a form of software. The steps of the method disclosed with reference to the embodiments of this application may be directly performed by using a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, a register, or the like. The storage medium is located in the memory, and the processor executes the instruction in the memory and completes the steps in the foregoing method in combination with hardware of the processor. To avoid repetition, details are not described herein again.

In this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between the associated objects. "At least one (piece) of the following" or a similar expression thereof means any combination of these items, including any combination of singular items (pieces) or plural items (pieces). For example, at least one of a, b, or c may indicate a, b, c, a and b, a and c, b and c, or a, b, and c, where a, b, and c may be singular or plural.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A beam training method, comprising:
   determining, by a first access point (AP), first information, wherein the first information is used to indicate an association beamforming training (A-BFT) time period, the A-BFT time period is used to perform A-BFT between a plurality of APs and a station (STA) within coverage of the plurality of APs, and the plurality of APs comprise the first AP and at least one second AP;
   sending, by the first AP, the first information;

wherein the first information is further used to indicate a first time period occupied by the STA to perform sector sweep, and a second time period occupied by the at least one second AP to send second information; and after the sending, by the first AP, the first information, the method further comprises receiving, by the first AP, a sector sweep frame that is sent by a STA within coverage of the first AP in the first time period; and the method further comprises:
receiving, by the first AP, the second information that is sent by the at least one second AP in the second time period, wherein
the second information is used to indicate a first sector selection result, and the first sector selection result is obtained by performing sector sweep in the first time period.

2. The method according to claim 1, wherein the A-BFT time period is used by any STA within the coverage of the plurality of APs to perform sector sweep; or
the A-BFT time period comprises a plurality of A-BFT time sub-periods, each of the plurality of A-BFT time sub-periods corresponds to at least one of the plurality of APs, and each A-BFT time sub-period is used by a STA within coverage of an AP corresponding to each A-BFT time sub-period to perform sector sweep.

3. The method according to claim 2, wherein the first information is further used to indicate a third time period occupied by the first AP or the at least one second AP to send the third information to the STA; and
the method further comprises:
sending, by the first AP, the third information to the at least one second AP based on the second information, to enable the at least one second AP sends the third information to the STA in the third time period; or
sending, by the first AP, the third information to the STA in the third time period, wherein the third information sent to the STA is used to indicate a second sector selection result of the at least one second AP, and the second sector selection result comprises all or a part of the first sector selection result of the at least one second AP.

4. The method according to claim 1, wherein the sending, by the first AP, the first information comprises at least one of follows:
broadcasting, by the first AP, a beacon frame that carries the first information;
sending, by the first AP, the first information to the at least one second AP, so that the at least one second AP broadcasts a beacon frame that carries the first information.

5. A beam training method, comprising:
receiving, by a first station STA, first information, wherein the first information is used to indicate an association beamforming training A-BFT time period, the A-BFT time period is used to perform A-BFT between a plurality of APs and a STA within coverage of the plurality of APs, the plurality of APs comprise a first AP and at least one second AP, and the STA comprises the first STA;
determining, by the first STA based on the first information, a time period for performing sector sweep;
wherein the first information is further used to indicate a first time period occupied by the first STA to perform the sector sweep, and a second time period occupied by the at least one second AP to send second information, the second information is used to indicate a first sector selection result, and the first sector selection result is obtained by performing the sector sweep in the first time period; and
after the determining, by the first STA based on the first information, the time period for performing the sector sweep, the method further comprises:
sending, by the first STA, a sector sweep frame in the first time period.

6. The method according to claim 5, wherein the A-BFT time period is used by any STA within the coverage of the plurality of APs to perform sector sweep; and
the determining, by the first STA based on the first information, a time period for performing sector sweep comprises:
determining, by the first STA based on the first information, the A-BFT time period as the time period that be used by the first STA to perform the sector sweep.

7. The method according to claim 5, wherein the A-BFT time period comprises a plurality of A-BFT time sub-periods, each of the plurality of A-BFT time sub-periods corresponds to at least one of the plurality of APs, and each A-BFT time sub-period is used by a STA within coverage of an AP corresponding to each A-BFT time sub-period to perform sector sweep; and
the determining, by the first STA based on the first information, a time period for performing sector sweep comprises:
determining, by the first STA based on the first information, an A-BFT time sub-period that is in the A-BFT time period and that corresponds to an AP covering the first STA as the time period that be used by the first STA to perform the sector sweep.

8. The method according to claim 5, wherein the first information is further used to indicate a third time period occupied by the first AP or the at least one second AP to send the third information to the STA; and
the method further comprises:
receiving, by the first STA, the third information that is sent by the first AP or the at least one second AP in the third time period, wherein the third information is used to indicate a second sector selection result of the at least one second AP, and the second sector selection result comprises all or a part of the first sector selection result of the at least one second AP.

9. The method according to claim 5, wherein the receiving, by a first station STA, first information comprises at least one of follows:
receiving, by the first STA, a beacon frame that is broadcast by the first AP that carries the first information;
receiving, by the first STA, a beacon frame that is broadcast by the at least one second AP that carries the first information.

10. A beam training apparatus, comprising:
a transceiver;
a non-transitory memory comprising computer-executable instructions; and
one or more processors in communication with the transceiver and the memory, wherein the instructions are executed to carry out a method comprising:
determining, by the processor, first information, wherein the first information is used to indicate an association beamforming training (A-BFT) time period, the A-BFT time period is used to perform A-BFT between a plurality of APs and a station (STA) within coverage of the plurality of APs, and the plurality of APs comprise a first AP and at least one second AP; and
sending, by the transceiver, the first information;

wherein the first information is further used to indicate a first time period occupied by the STA to perform sector sweep, and a second time period occupied by the at least one second AP to send second information; and after sending the first information, the transceiver is further configured to receive a sector sweep frame that is sent by a STA within coverage of the apparatus in the first time period; and the transceiver is further configured to:
receive the second information that is sent by the at least one second AP in the second time period, wherein
the second information is used to indicate a first sector selection result, and the first sector selection result is obtained by performing the sector sweep in the first time period.

11. The apparatus according to claim 10, wherein the A-BFT time period is used by any STA within the coverage of the plurality of APs to perform sector sweep; or
the A-BFT time period comprises a plurality of A-BFT time sub-periods, each of the plurality of A-BFT time sub-periods corresponds to at least one of the plurality of APs, and each A-BFT time sub-period is used by a STA within coverage of an AP corresponding to each A-BFT time sub-period to perform sector sweep.

12. The apparatus according to claim 10, wherein the first information is further used to indicate a third time period occupied by the apparatus or the at least one second AP to send to the STA the third information; and
the transceiver is further configured to:
send the third information to the at least one second AP based on the second information, to enable the at least one second AP sends the third information to the STA in the third time period; or
send the third information to the STA in the third time period, wherein
the third information sent to the STA is used to indicate a second sector selection result of the at least one second AP, and the second sector selection result comprises all or a part of the first sector selection result of the at least one second AP.

13. The apparatus according to claim 10, wherein the transceiver is specifically configured to at least one of follows:
broadcast a beacon frame that carries the first information;
send the first information to the at least one second AP, so that the at least one second AP broadcasts a beacon frame that carries the first information.

* * * * *